(12) United States Patent
Reddy et al.

(10) Patent No.: US 10,182,056 B1
(45) Date of Patent: Jan. 15, 2019

(54) DESCENDENT CASE ROLE ALIAS

(71) Applicant: Open Text Corporation, Waterloo (CA)

(72) Inventors: Satyapal P. Reddy, Fremont, CA (US); Muthukumarappa Jauakumar, Mountain House, CA (US); Julian M. Hjortshoj, San Francisco, CA (US); Ravikumar Meenakshisundaram, Pleasanton, CA (US)

(73) Assignee: Open Text Corporation, Waterloo (CA)

( * ) Notice: Subject to any disclaimer, the term of this patent is extended or adjusted under 35 U.S.C. 154(b) by 456 days.

(21) Appl. No.: 14/502,222

(22) Filed: Sep. 30, 2014

Related U.S. Application Data

(60) Provisional application No. 62/031,592, filed on Jul. 31, 2014.

(51) Int. Cl.
*G06F 7/04* (2006.01)
*H04L 29/06* (2006.01)

(52) U.S. Cl.
CPC ............ *H04L 63/101* (2013.01); *H04L 63/08* (2013.01)

(58) Field of Classification Search
None
See application file for complete search history.

(56) References Cited

U.S. PATENT DOCUMENTS

| | | | |
|---|---|---|---|
| 5,960,200 A | 9/1999 | Eager et al. | |
| 7,080,077 B2 | 7/2006 | Ramamurthy et al. | |
| 7,792,860 B2 | 9/2010 | Shrivastava et al. | |
| 8,452,726 B2 | 5/2013 | Kuruganti et al. | |
| 9,319,356 B2* | 4/2016 | Odell | H04L 51/04 |
| 9,405,929 B1 | 8/2016 | Van Rotterdam et al. | |
| 9,934,401 B2 | 4/2018 | Van Rotterdam et al. | |
| 10,032,124 B1 | 7/2018 | Reddy et al. | |
| 10,122,717 B1 | 11/2018 | Reddy et al. | |
| 2004/0162906 A1 | 8/2004 | Griffin et al. | |
| 2004/0250120 A1 | 12/2004 | Ng | |
| 2006/0064434 A1* | 3/2006 | Gilbert | G06F 17/3012 |
| 2006/0230042 A1 | 10/2006 | Butler et al. | |
| 2007/0044144 A1 | 2/2007 | Knouse et al. | |
| 2007/0179890 A1 | 8/2007 | Sandford et al. | |
| 2009/0119298 A1 | 5/2009 | Faitelson et al. | |
| 2009/0171897 A1 | 7/2009 | Spinola et al. | |

(Continued)

OTHER PUBLICATIONS

Office Action for U.S. Appl. No. 14/502,246, dated Dec. 31, 2015, 8 pgs.

(Continued)

*Primary Examiner* — Brandon S Hoffman
(74) *Attorney, Agent, or Firm* — Sprinkle IP Law Group

(57) ABSTRACT

Case management systems and techniques are disclosed. In various embodiments, a definition is received that associates a descendant case role alias with a first case node at a first hierarchical level of a hierarchical data model, the definition further associating a permission with the descendant case role alias and referencing a referenced case role associated with a second case node at a second hierarchical level of the hierarchical data model. The definition is used to extend the permission to a user assigned to the referenced case role with respect to a case instance comprising the hierarchical data model.

20 Claims, 22 Drawing Sheets

(56) References Cited

U.S. PATENT DOCUMENTS

| | | | |
|---|---|---|---|
| 2010/0082133 A1* | 4/2010 | Chouinard | G06F 8/20 700/86 |
| 2011/0302133 A1 | 12/2011 | Kuruganti et al. | |
| 2012/0011161 A1 | 1/2012 | Marathe | |
| 2012/0059906 A1 | 3/2012 | Ciancio-Bunch et al. | |
| 2012/0137360 A1* | 5/2012 | Henderson | G06F 21/6218 726/17 |
| 2012/0304247 A1* | 11/2012 | Badger | G06F 21/6218 726/1 |
| 2013/0144911 A1 | 6/2013 | Watanabe | |
| 2016/0203157 A1 | 7/2016 | Kuruganti et al. | |
| 2016/0357984 A1 | 12/2016 | Van Rotterdam et al. | |

OTHER PUBLICATIONS

Office Action for U.S. Appl. No. 14/502,194, dated Aug. 30, 2017, 20 pgs.

Office Action for U.S. Appl. No. 14/145,048, dated Jan. 29, 2015, 8 pgs.

Office Action for U.S. Appl. No. 14/145,048, dated Aug. 7, 2015, 10 pgs.

Office Action for U.S. Appl. No. 14/145,048, dated Jan. 19, 2016, 10 pgs.

Office Action for U.S. Appl. No. 14/145,048, dated Jul. 14, 2016, 10 pgs.

Office Action for U.S. Appl. No. 14/145,048, dated Dec. 30, 2016, 10 pgs.

Office Action for U.S. Appl. No. 14/145,048, dated Jul. 12, 2017, 10 pgs.

Office Action for U.S. Appl. No. 15/198,862, dated Jun. 29, 2017, 9 pgs.

Notice of Allowance for U.S. Appl. No. 15/198,862, dated Nov. 21, 2017, 8 pgs.

Notice of Allowance for U.S. Appl. No. 14/145,048, dated Jan. 2, 2018, 14 pgs.

Office Action for U.S. Appl. No. 15/918,751, dated Jul. 23, 2018, 8 pgs.

Notice of Allowance for U.S. Appl. No. 14/502,194, dated Mar. 22, 2018, 6 pgs.

Notice of Allowance for U.S. Appl. No. 14/145,048, dated May 16, 2018, 5 pgs.

Notice of Allowance issued for U.S. Appl. No. 15/918,751, dated Oct. 31, 2018, 7 pages.

* cited by examiner

DESCENDENT CASE ROLE ALIAS

CROSS REFERENCE TO OTHER APPLICATIONS

This application claims priority to U.S. Provisional Patent Application No. 62/031,592 entitled HIERARCHICAL PERMISSIONS AND CASE ROLES FOR CASE MANAGEMENT, filed Jul. 13, 2014, which is incorporated herein by reference for all purposes.

BACKGROUND OF THE TECHNOLOGY

Case management systems, software, and/or cloud-based or other electronically-provided case management services (collectively, "Case Management Systems") are used to automate the management of complex sets of documents or other content and associated business or other processes, particularly in situations in which the documents or other content that may need to be managed for respective particular instances of a case model/type (e.g., a loan application) may not be the same for each instance and the processing required and/or selected to be performed may not be the same for each instance.

A case model ("Case Model") typically describes a type of case, instances of which are to be managed by a Case Management System. As opposed to very structured business process that defines a predetermined work flow that does not vary from instance to instance, using a Case Model one can model ad hoc actions and define responses thereto with mini workflows, enabling the processing of respective instances of a Case Model to be determined dynamically at runtime based, e.g., on events, context data, user input, dynamic evaluation of documents or other content, etc. As a result, each instance of a Case Model (e.g., the respective loan applications of different applicants) may follow its own course as determined at each step by processing as defined in applicable portions of the Case Model.

BRIEF DESCRIPTION OF THE DRAWINGS

Various embodiments of the technology are disclosed in the following detailed description and the accompanying drawings.

DETAILED DESCRIPTION

The technology can be implemented in numerous ways, including as a process; a system; a computer program product embodied on a computer readable storage medium; and/or a processor, such as a processor configured to execute instructions stored on and/or provided by a memory coupled to the processor. In general, the order of the steps of disclosed processes may be altered within the scope of the technology. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the technology is provided below along with accompanying figures that illustrate the technology. The technology is described in connection with such embodiments, but the technology is not limited to any embodiment. The scope of the technology is limited only by the claims and the technology encompasses numerous alternatives, modifications and equivalents. Numerous specific details are set forth in the following description in order to provide a thorough understanding of the technology. These details are provided for the purpose of example and the technology may be practiced according to the claims without some or all of these specific details.

A hierarchical permissions model for case models is disclosed. In various embodiments, case roles may be defined and at case nodes in the hierarchy one or more case roles may be associated with that case node and for each role the associated permissions of that role at that case node may be specified.

Providing the ability to define/identify a case role by a "descendent case role alias" in the context of a hierarchical permissions model for case management is disclosed. In various embodiments, a descendent case role alias may be a role that a user is deemed to be associated with by virtue of having been assigned more directly another role for a case instance. For example, a user defining a case model may include for a root or other higher level node a case role "case viewer", which role is deemed to be held by users who fill referenced roles defined and/or assigned at lower nodes in the hierarchy.

Figure 1:
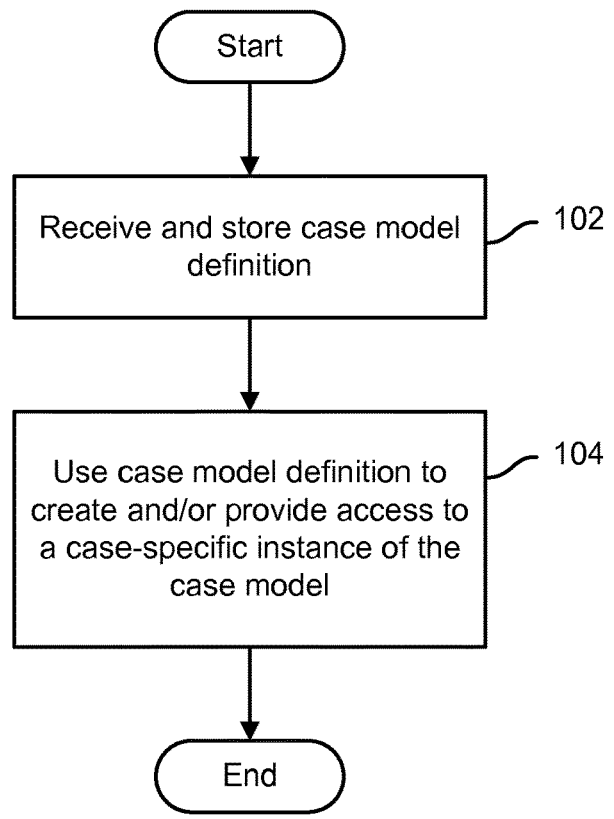
FIG. 1 is a flow chart illustrating an example embodiment of a process to perform case management.

FIG. 1 is a flow chart illustrating an example embodiment of a process to perform case management. In the example shown, a case model definition is received and stored (102). The case model definition is used to create new instances based on the case model, sometimes referred to herein as "case instances" or "case management instances", and/or to provide access to previously-created instances (104). For example, a case model may be defined and stored for a loan application and associated processes. Case instances may be created based on the case model and each respective case instance used to manage a corresponding loan application, for example by different respective loan applicants.

A case model typically describes a case management system. Using a case model, one can model ad hoc actions with mini workflows, for example, as opposed to very structured process that defines an end-to-end business workflow. In various embodiments, a case model comprises a hierarchical/nested container model (sometimes referred to herein as a "hierarchical data model"), and may in addition define case roles, case phases (states), and/or permissions. In some embodiments, permissions may be defined for each case node and/or level in the hierarchy, and may vary in some embodiments based at least in part on the respective phases (states) of a state machine defined for a case node.

In various embodiments, a case model may include a hierarchical/nested container model. This model represents how the data with in a case is organized and what data is captured during runtime. Each node in the hierarchy is sometimes referred to herein as a "case node". Case nodes at the lowest level of a case model hierarchy may be referred to as "case leaf nodes" or simply "leaf nodes". "Case leaf nodes" in various embodiments may point to a specific business object or document type.

The term "case role" is used herein to refer to user roles that have been defined in a case model. In various embodiments, users may be assigned to case roles with respect to instances of a case model, and at each case node in the case model permissions may be designated by reference to one or more case roles. During runtime in some embodiments members may be added or removed from these roles at case node instances corresponding to respective instances of a type of case as defined in a case model.

In various embodiments, at each case node a metadata model that defines one or more traits and/or associated behavior may be defined.

In various embodiments, a case model as described herein may be created using a domain-specific or other develop-ment module or tool. For example, reusable elements, such sample case nodes typical of those used in the domain (e.g., documents, case roles, behaviors, etc. Typically associated with a loan application process, a new drug approval application, etc.), primitives usable to define a state machine and/or associated processing for respective case nodes, etc., may be provided. For example, an application programming interface (API) may be defined, and/or a visual or other case model development tool may be provided.

In various embodiments, a case model definition is embodied in an eXtensible Markup Language (XML) or other structured data file. A case management system and/or platform is provided, which is configured (e.g., by software) to load a case model definition, parse the definition, and create an instance of the case model based on the definition. Instance-specific attributes and/or state information or other metadata may be stored in a case model instance data store, e.g., a database. At runtime, the case model definition file and the case model instance data for a given instance are used by the disclosed case management system to implement the case model instance, including by performing processing and managing case model instance associated content per the case model definition, in light of the current values of the case model instance data for that instance.

Figure 2:
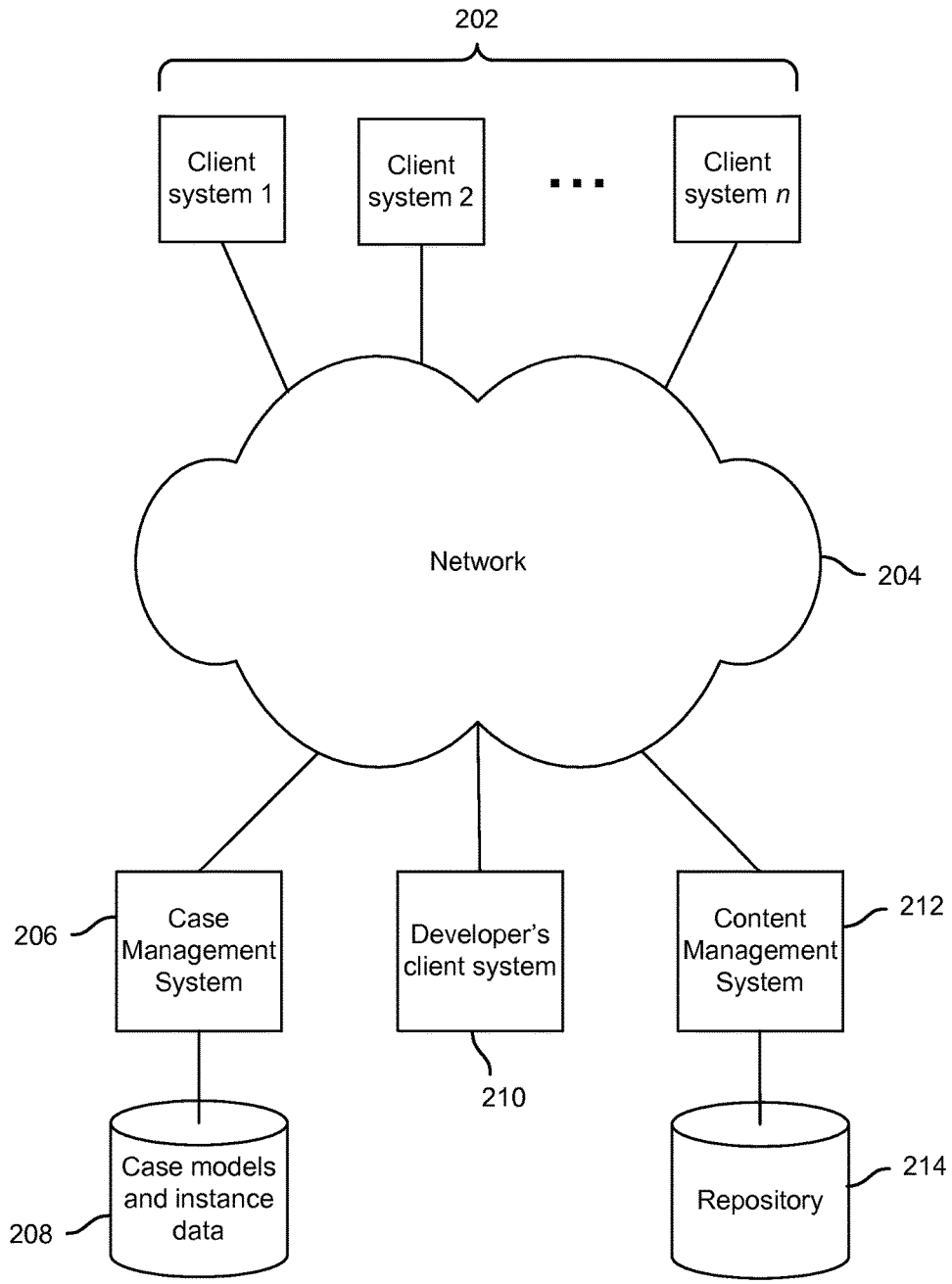
FIG. 2 is a block diagram illustrating an example embodiment of a case management system and environment.

FIG. 2 is a block diagram illustrating an example embodiment of a case management system and environment. In the example shown, client systems 202 are connected via a network 204, e.g., the Internet, to a case management system 206. In various embodiments, the case management system 206 may be configured to implement the process of FIG. 1. Case management system 206 uses case models stored in data storage 208 to provide case management services with respect to case management instances, the instance variable data values of which also are stored, in this example, in data storage 208. For example, one or more of clients 202 may connect via network 204 to case management system 206 to obtain access to case management services. For example, case management system 206 may expose a "case management system as a service", e.g., as a web service, enable clients 202 to connect to case management system 206, create case management instances based on case models stored in data storage 208. The users of client system 202 may be prompted to provide data values and/or other user input to populate case management instances with metadata, user data, documents, etc., and/or such other user input as may be required to advance case instances through case management processing as defined in the case model.

In the example shown in FIG. 2, a case model developer system 210, e.g., a client computer system, also can connect to case management system 206 via network 204. In some embodiments, a case model development user interface and/or service may be accessed and used to define a case model. For example, a visual or other developer tool may be presented to enable a developer using client system 210 to define a case model and cause the case model to be stored in data storage 208 and deployed by case management system 206. In some embodiments, deployment of a case model includes making the case model available to be used to create case management instances based on the model, and to use the case model to perform with respect to each such instance the case management processing as defined in the case model.

In various embodiments, a case model may indicate one or more content objects to be associated with respective instances of a case model. The case model may include metadata and associated behaviors to enable instance-specific content objects (e.g., documents) to be associated with case leaf nodes of a case instance. In the example shown in FIG. 2, content objects may be accessed via a content management system 212 configured to manage content objects stored in an associated content repository 214. In various embodiments, case management system 206 may be configured to use instance variables associated with a given case instance and metadata and/or behaviors defined in an associated case model to interact programmatically with content management system 212 to obtain and/or manage documents or other content objects associated with a case instance. In some embodiments, case management system 206 may be configured, e.g., via the case model, to invoke services and/or other functionality of content management system 212 with respect to such documents or other content objects.

Figure 3:
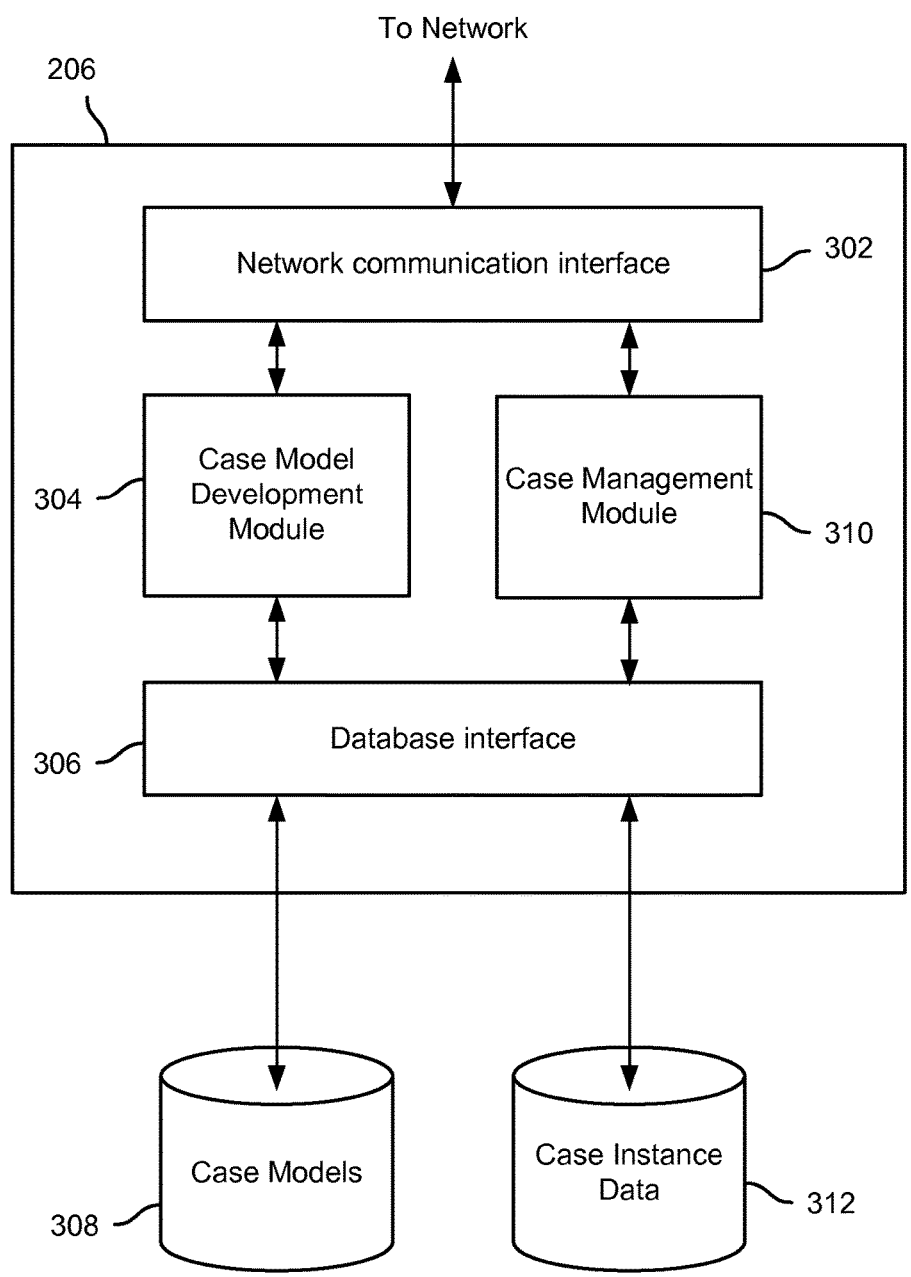
FIG. 3 is a block diagram illustrating an example embodiment of a case management system.

FIG. 3 is a block diagram illustrating an example embodiment of a case management system. In some embodiments, the case management system of FIG. 3 corresponds to case management system 206 of FIG. 2. In the example shown, case management system 206 includes a network communication interface 302, such as a wireless or other network interface card, to provide network connectivity, e.g., to network 204 of FIG. 2. A case model development module 304 is accessible to developers via network communication interface 302 and may be used to create and/or modify case model definitions. In some embodiments, a visual or other user interface is provided, via network communication interface 302, to enable case models to be created and/or modified. For example, a developer may use a browser to access the developer user interface in some embodiments. Case model definitions are stored by case model development module 304 by using a backend database (or other data storage) interface 306 to store the case model(s) in case model store 308.

Referring further to FIG. 3, the case management system 206 includes a case management module 310. In various embodiments, case management module 310 includes functionality to enable users, e.g., users of client systems 202 of FIG. 2, to create and/or use case management instances based on case models stored in case model store 308. Case management module 310, for example, may expose a web or other interface to remote users and may receive via said interface a request to create and/or access a case instance. Case management module 310 uses database interface 306 to obtain an associated case model definition from case model store 308, to use the case model to instantiate case instances. Instance variables are stored by case management module 310 in case instance data store 312.

Figure 4:
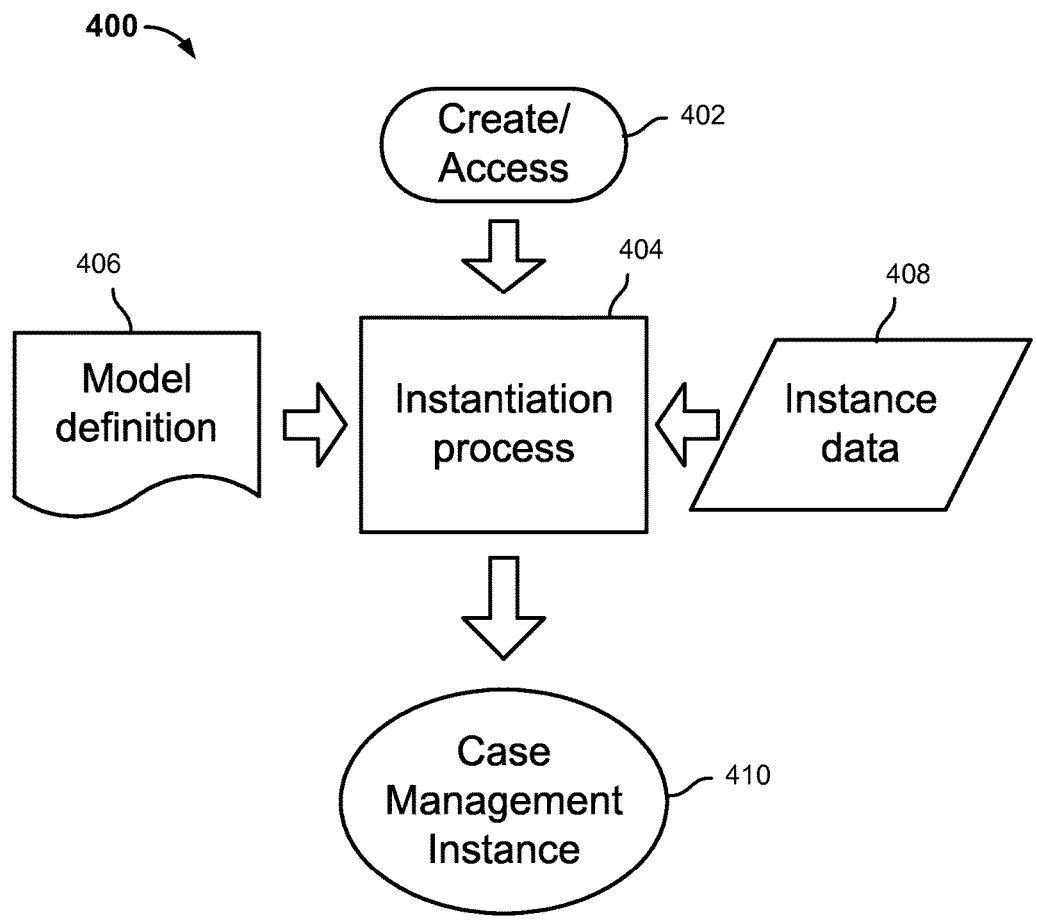
FIG. 4 is a diagram illustrating an example embodiment of a process and system to create and/or provide access to case management instances.

FIG. 4 is a diagram illustrating an example embodiment of a process and system to create and/or provide access to case management instances. In some embodiments, the process of FIG. 4 may be implemented by a case management system and/or a component thereof, such as case management module 310 of FIG. 3. In the example shown, case management system 400 receives a request 402 to create or access a case management instance and invokes instantiation process 404. Instantiation process 404 uses a case model definition 406 associated with the request, e.g., a case model indicated explicitly and/or otherwise associated with data comprising the request 402, and case management instance data 408 associated with the case management instance, to instantiate and provide access to a case management instance 410.

In various embodiments, a case model definition such as model definition 406 may include an XML file or other structured data, which the case management system is configured to parse and use to construct case instances based on the case model. For example, the hierarchical data structure may be defined, along with metadata and associated behaviors for each case node. A case management instance, such as case management instance 410, may include an in memory instance of a data structure defined in case model definition 406, which is used to store instance variables, such as instance data 408 in this example.

Figure 5:
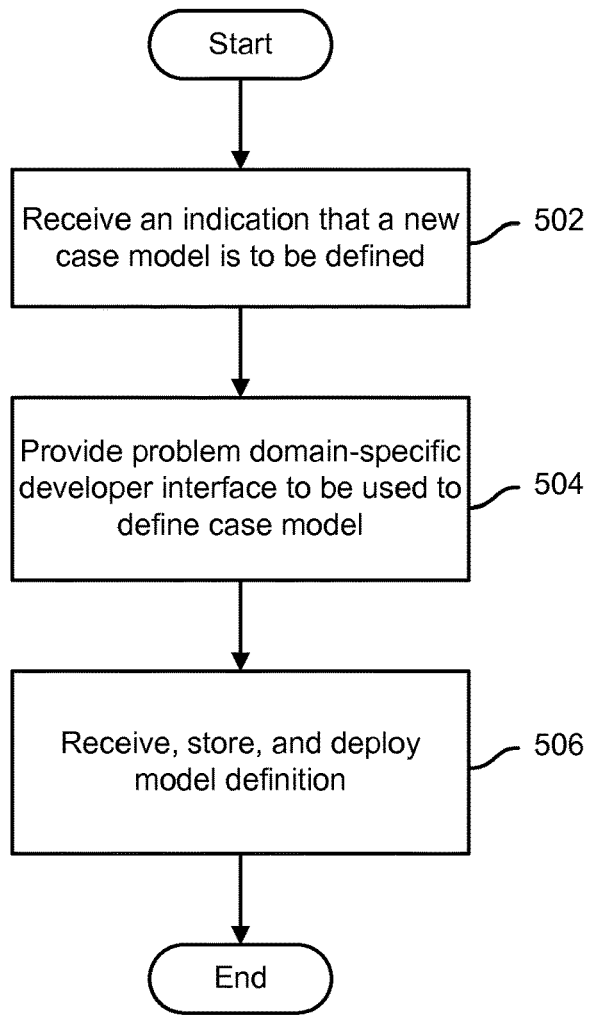
FIG. 5 is a flow chart illustrating an example embodiment of a process to receive and store a case model.

FIG. 5 is a flow chart illustrating an example embodiment of a process to receive and store a case model. In some embodiments, the process of FIG. 5 is used to implement step 102 of FIG. 1 and is performed by a case management system, such as case management system 206 of FIG. 2, e.g., case model development module 304 of FIG. 3. In the example shown, an indication that a new case model is to be defined is received (502). A problem domain-specific developer interface to be used to define the case model is provided (504). For example, in some embodiments a developer may indicate in a request to define a new case model, and/or may be prompted to indicate, a "problem domain" with which the case model is associated, such as a loan application, an employment application, a product development or other business project, a healthcare or other patient, a claim for reimbursement or benefits, or a matter being handled by a professional or personal service provider, such as a lawsuit, home renovation project, etc. In various embodiments, the problem domain-specific developer interface provides access to problem domain-specific elements to assist the developer in defining the case model. For example, a loan application typically is initiated by a loan applicant submitting an application, and typically involves gathering information to verify and evaluate the applicant's identity, financial assets, income, creditworthiness, etc. In some embodiments, a template may be provided to be used as a starting point. The developer uses visual or other tools to customize the template as desired to define a case model.

Once the developer has completed and submitted the case model definition, the case model definition is received, stored, and deployed (506). In some embodiments, a runtime representation of the definition is processed, e.g., upon submission by the developer, to generate an XML or other structured data file that embodies the case model as defined. Deployment in various embodiments includes making the case model definition available to be used to instantiate case management instances based on the case model, e.g., individual loan application cases.

Figure 6:
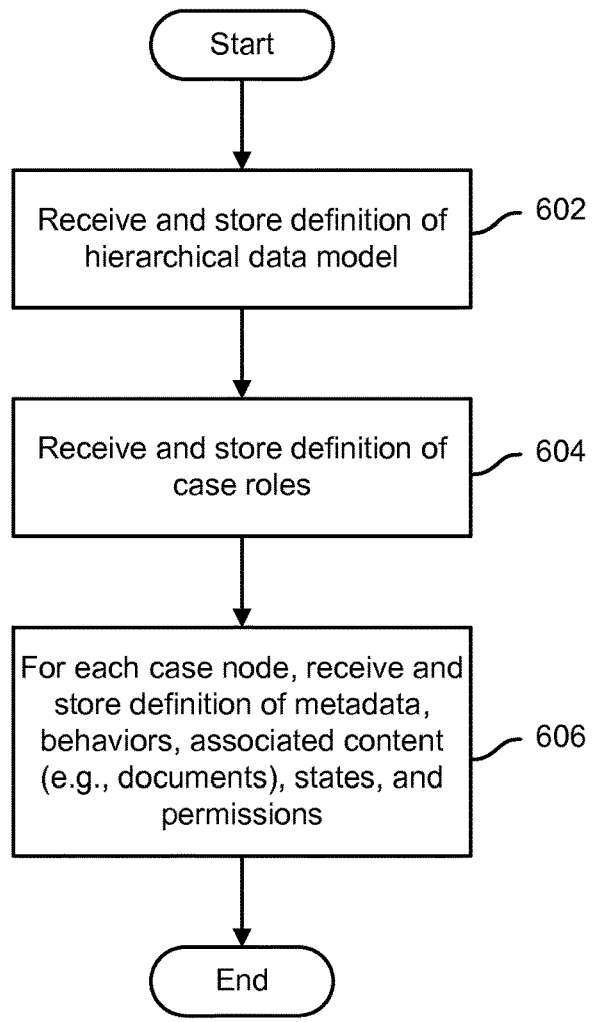
FIG. 6 is a flow chart illustrating an example embodiment of a process to receive and store a case model.

FIG. 6 is a flow chart illustrating an example embodiment of a process to receive and store a case model. In some embodiments, the process of FIG. 6 is included in step 506 of FIG. 5. In the example shown, a definition of a hierarchical/nested data model is received (602). For example, a user interface that enables a developer to drag and drop case nodes onto a canvass and to indicate hierarchical relationships between case nodes may be provided and used by the developer to define a hierarchical/nested data model. A definition of case roles is received and stored (604). For example, a "loan application" case model may include user roles such as "loan initiator", "underwriter", "appraiser", etc. For each case node in the hierarchical/nested data model, a definition of metadata, behaviors, content (e.g., documents), states/phases (and transitions between states/phases), and/or permissions (e.g., by case role) is received (606). For example, in various embodiments a developer interface may be provided to enable a developer to select a case node and be presented with an interface to define a state machine for that case node.

Figure 7:
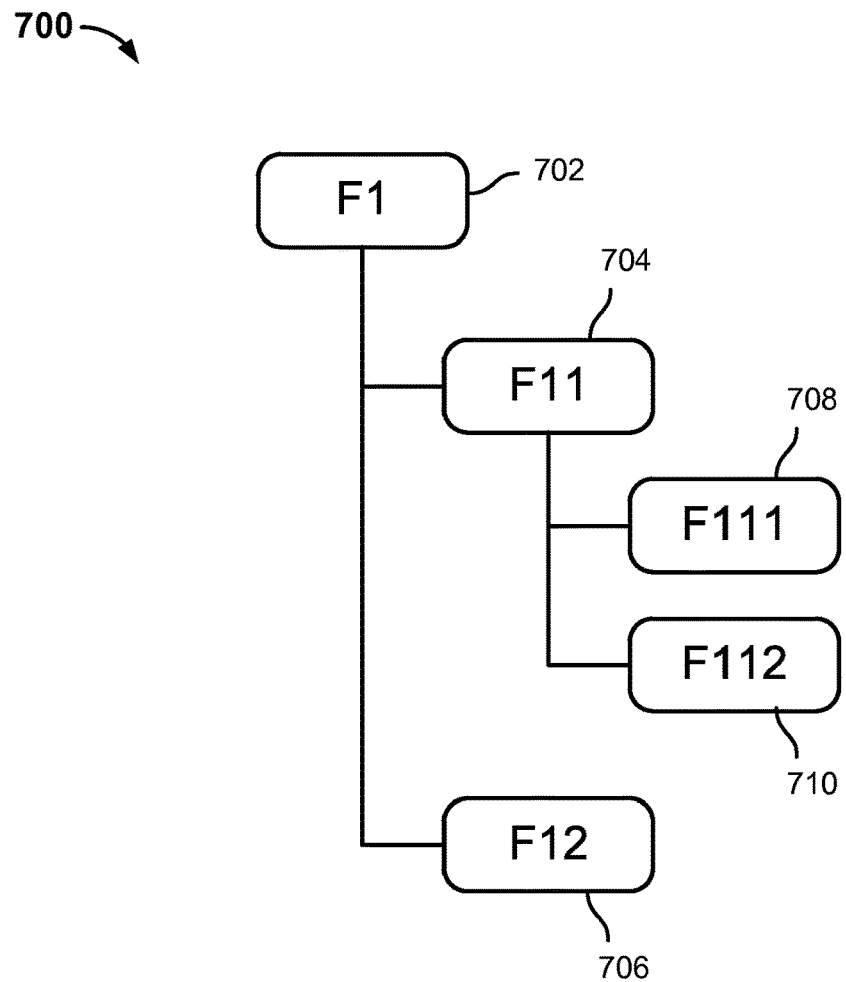
FIG. 7 is a block diagram illustrating an example of a hierarchical data model in an embodiment of a case management system.

FIG. 7 is a block diagram illustrating an example of a hierarchical data model in an embodiment of a case management system. In various embodiments, a case model, such as one defined using the processes of FIGS. 5 and 6, may include a hierarchical/nested container model, such as the one shown in FIG. 7. In the example shown, hierarchical/nested container model 700 includes a root node 702 at a first (highest) hierarchical level. At a first hierarchical level below the root node, nodes 704 and 706 are included. Finally, in a lowest hierarchical level (in this example), node 704 has two "case leaf nodes" 708 and 710. In various embodiments, metadata, behaviors, permissions, etc. that have been defined for a case node extend (or in some embodiments may at the option of the case model developer be extended) to child case nodes of the case node at which such metadata, behaviors, permissions, etc. have been defined.

Figure 8:
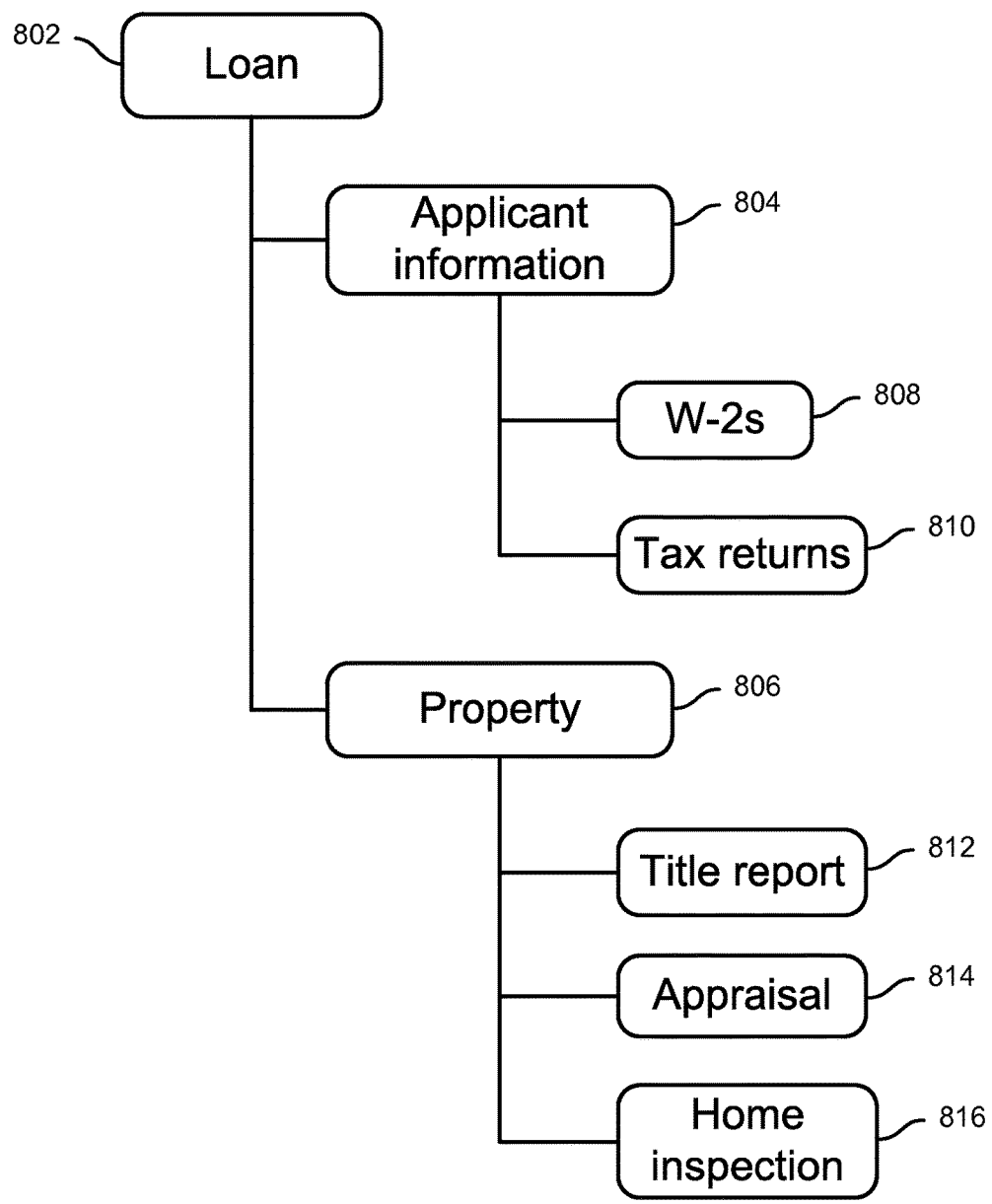
FIG. 8 is a block diagram illustrating an example of a hierarchical data model in an embodiment of a case management system

FIG. 8 is a block diagram illustrating an example of a hierarchical data model in an embodiment of a case management system, such as case management system 206 of FIG. 2. In particular, a hierarchical/nested container model for a home loan application is illustrated. In the example shown, each instance of a "loan" case includes a root node 802 and two first level sub-nodes 804 and 806, in this example one (804) for financial information of the applicant and associated processing, and another (806) for information and processing associated with the home to be purchased using the loan. The "applicant information" sub-node 804 includes a first case leaf node 808 for Forms W-2 and a second case leaf node 810 for the applicant's tax returns. "Property" sub-node 806 includes case leaf nodes 812, 814, and 816 for the title report, appraisal report, and home inspection report, respectively. In various embodiments, the case model definition may include for each case node a definition of metadata and/or behaviors for that case node. For case leaf nodes, such as case leaf nodes 808, 810, 812, 814, and 816, the case model definition may include information regarding documents or other content objects to be associated with such nodes, including in some embodiments an identification of a storage location in which such documents are to be stored, e.g., in a content repository such as repository 214 of FIG. 2 associated with a content management system such as content management system 212 of FIG. 2.

Figure 9:
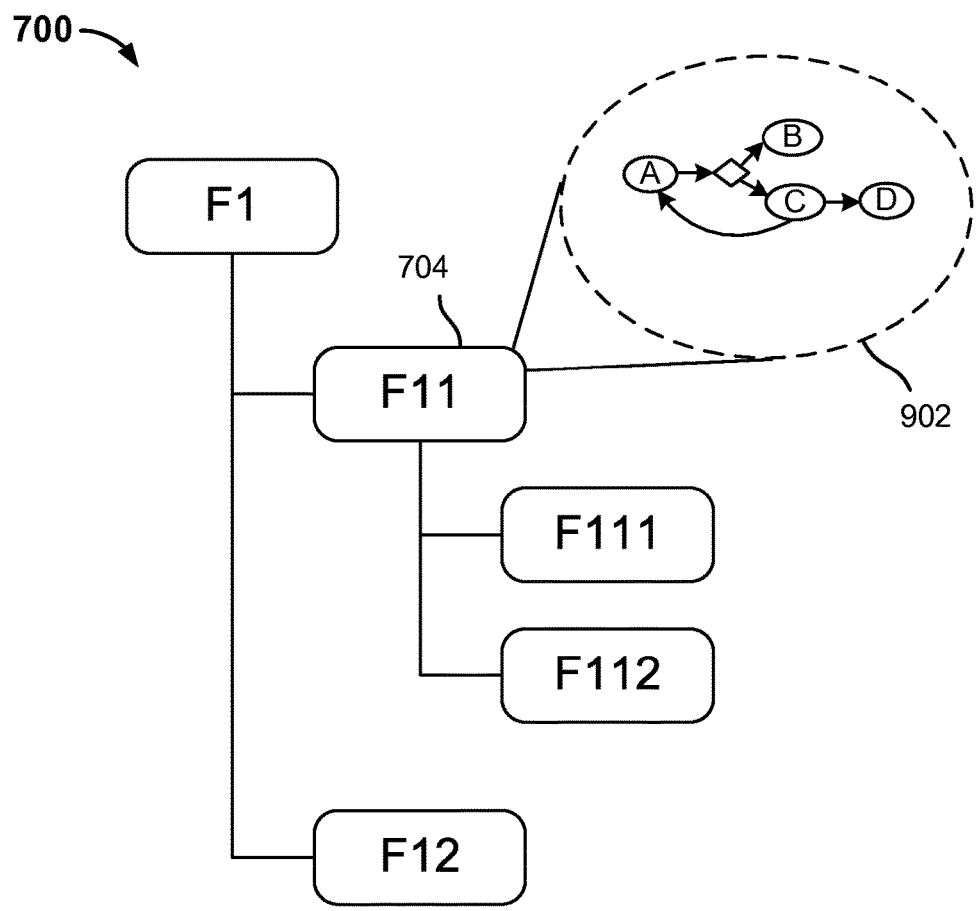
FIG. 9 is a block diagram illustrating an example of a hierarchical data model and associated state machine in an embodiment of a case management system.

FIG. 9 is a block diagram illustrating an example of a hierarchical data model and associated state machine in an embodiment of a case management system. In various embodiments, the hierarchical data model and associated state machine of FIG. 9 may be included in a case model definition defined and/or deployed via a case management system such as case management system 206 of FIGS. 2 and 3. In the example shown, a state machine 902 has been defined for and associated with case node 704 of hierarchical/nested container model 700 of FIG. 7.

In various embodiments, for any case node within the hierarchical/nested container model, a state machine can be defined and the actions that can be used to transition between different phases/states of the state machine defined for that case node may be specified. These actions could be used during runtime to transition between states.

In the example shown in FIG. 9, a state machine 902 has been defined and associated with a specific case node in the hierarchical model shown in FIG. 7, specifically node "F11" (704). In various embodiments, a document or other content associated with node "F11"; traits, such as metadata and/or associated behavior associated with node "F11"; etc. may be transformed, reviewed, and/or otherwise involved with processing that may result, in a given case model instance, in transitions being made between states of the state machine 902 defined for case node "F11" in this example.

In various embodiments, enabling a state machine to be defined and associated with a case node comprising a hierarchal/nested container model provides a flexible, dynamic framework within which ad hoc actions and/or information can be responded to, in a manner determined dynamically based on the circumstances of a given instance of a case, with the result that the actions and/or processing performed at a given case node, and/or the consequences of such actions and/or processing, may be different for one instance of the case model than for another instance of the case model.

In various embodiments, a state machine engine may be included in a case management system, such as case management system 206 of FIG. 2, to enable a state machine defined for a case node, such as state machine 902 of FIG. 9, to be implemented and associated functionality to be provided. For example, in some embodiments, case management module 310 of FIG. 3 may include a state machine engine. In some embodiments, the state machine engine may receive and parse state machine definition portions of a case model definition, and may use such portions to create and manage runtime data structures associated with the respective defined states (phases) of the state machine and transitions between them. In some embodiments, state variables associated with a current state of a case node-specific state machine for a given instance of a case model may be stored persistently with other case management instance data, for example in a case instance data store such as data store 312 of FIG. 3.

Figure 10:
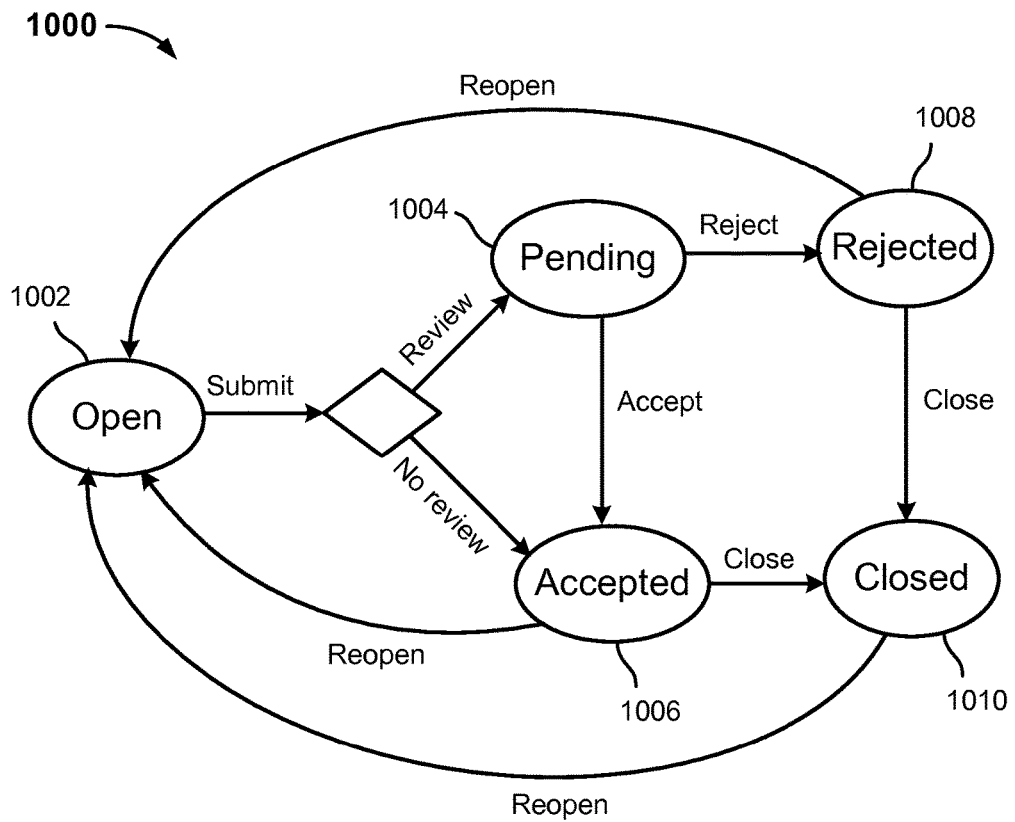
FIG. 10 is a block diagram illustrating an example of a state machine defined for a case node in an embodiment of a case management system.

FIG. 10 is a block diagram illustrating an example of a state machine defined for a case node in an embodiment of a case management system. In various embodiments, the state machine of FIG. 10 may be included in a case model definition defined and/or deployed via a case management system such as case management system 206 of FIGS. 2 and 3. In the example shown, state machine 1000 includes an "open" state 1002, associated for example with beginning processing of a received document, such as one created locally, uploaded, or otherwise provided by a user. In the example shown, a transition out of the "open" state 1002 may occur upon a "submit" option being selected, e.g., by a user, a business process, an external service, etc. If the item was submitted with an indication that a "review" is required (e.g., a reviewer is named or otherwise indicated), the state machine transitions to a "pending" state 1004, indicating the required review is pending. If no review is required, the state machine instead transitions directly to an "accepted" state 1006. If review was required and the reviewer "accepts" the item, a transition from "pending" state 1004 to "accepted" state 1006 occurs. If instead the reviewer were to "reject" the item, in this example a transition from "pending" state 1004 to "rejected" state 1008 would occur. From either "accepted" state 1006 or "rejected" state 1008, a "close" transition to a "closed" state 1010 could occur. Finally, in this example, "reopen" transitions back to "open" state 1002 could occur from the "accepted" state 1006, "rejected" state 1008, and/or "closed" state 1010.

Note that for a given instance of a case model with which the state machine 1000 of FIG. 10 is associated, the states through which the state machine 1000 of FIG. 10 may transition for that instance may be different than for one or more other instances. Also, for a given instance, depending on the state machine definition included in the case model definition, the user data associated with that instance at applicable times, and potentially user actions and decisions made in response to case information, the state machine 1000 may be transitioned to/through a given state more than once (e.g., via the "reopen" transitions), potentially resulting in different outcomes of processing associated with that state.

Figure 11:
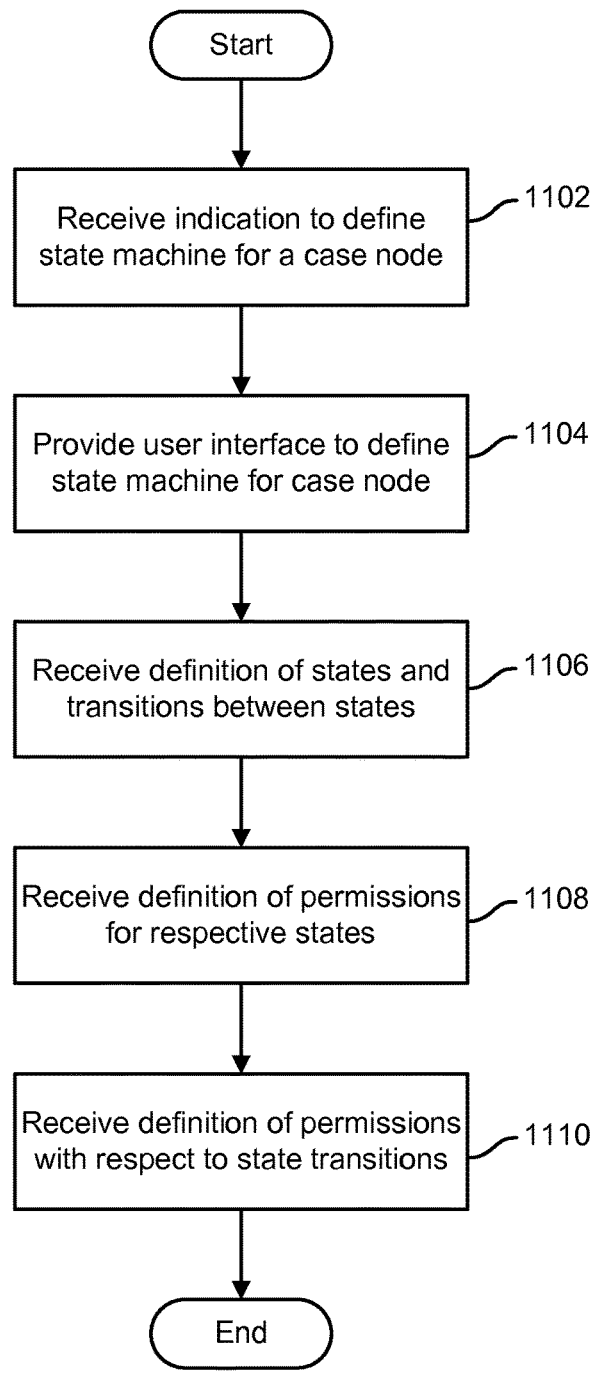
FIG. 11 is a flow chart illustrating an example embodiment of a process to define a state machine for a case node in an embodiment of a case management system.

FIG. 11 is a flow chart illustrating an example embodiment of a process to define a state machine for a case node in an embodiment of a case management system. In various embodiments, the process of FIG. 11 may be performed by a case management system, such as case management system 206 of FIGS. 2 and 3. For example, in some embodiments, a case model development component such as case model development module 304 of FIG. 3 may include a development tool and/or feature to enable a state machine to be defined and associated with a case node, using the process of FIG. 11.

In the example shown in FIG. 11, an indication to define a state machine for a case node is received (1102). For example, a developer using a case model definition tool, service, and/or interface may select a case node and provide an input indicating that a state machine is desired to be defined for and associated with the selected node. A developer user interface to define a state machine for the case node is provided (1104). A definition of two or more states and transition(s) between them is received (1106). A definition of permissions associated with the respective states, e.g., who may access content or metadata associated with the case node while the state machine is in that state, is received (1108). A definition of permissions associated with transitions between the respective states, e.g., who may cause each transition to occur, is received (1110). In various embodiments, a state machine defined for a case node using the process of FIG. 11 may be included in the case model definition as stored and deployed, e.g., in a corresponding portion of an XML or other structured data file comprising the case model definition.

A hierarchical permissions model for case models is disclosed. In various embodiments, the hierarchical permissions model is used at runtime, with respect to each case instance, to provide and control access to the case instance, associated content, and associated actions. For a given case model, in various embodiments the case model defines authorization permissions. For each of the case node in case hierarchical data model, in various embodiments permissions are modeled in such a way that a) which case role in b) which (state machine) phase has c) what permissions are defined.

In various embodiments, with reference to defining permissions, a case role may be a contained case role (defined at that case node) or a role defined at a parent level. Likewise a phase could be a phase defined at that particular case node or a phase defined at a parent case node.

In some embodiments, permissions defining a) users from which case role in b) which phase has c) what permissions with respect to metadata and content may be modeled.

In some embodiments, permissions are modeled defining a) users from which case role in b) which phase can c) add or remove users from that and other case roles.

In some embodiments, permissions are modeled defining a) users from which case role can b) in what phase c) can transition a case node from that phase to possible target phase. As an example, users belonging to "checklist item reviewer" case role may in a case model be given permission to move a checklist item from "pending" to "accepted" or "rejected". Similarly, users in a "checklist coordinator" case role may be given permission to move a checklist item from an "accepted" or "closed" state to an "open" state.

Figure 12:
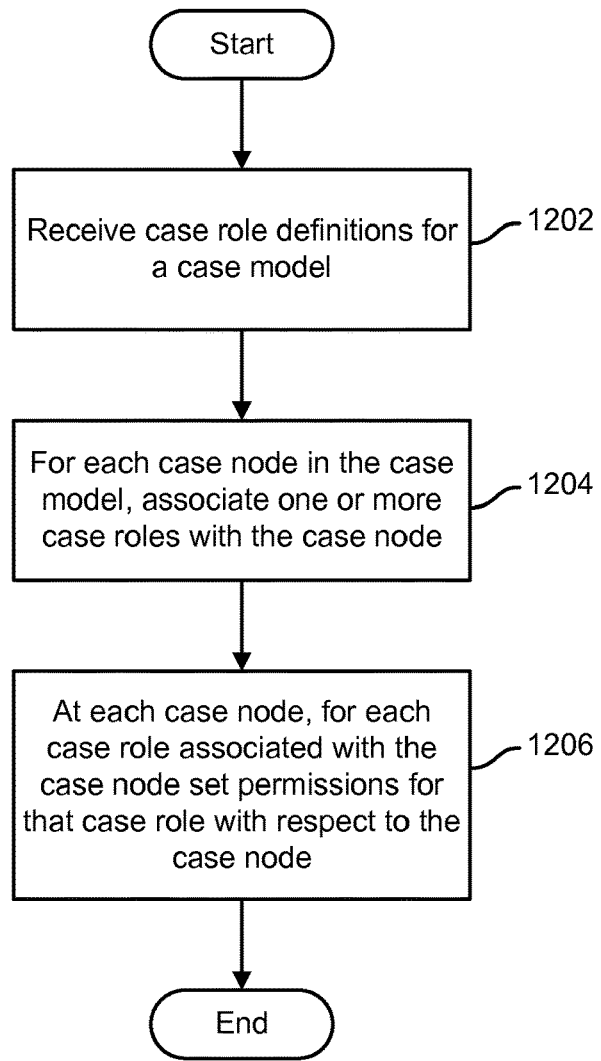
FIG. 12 is a flow chart illustrating an example embodiment of a process to define hierarchical permissions model for case management.

FIG. 12 is a flow chart illustrating an example embodiment of a process to define hierarchical permissions model for case management. In some embodiments, the process of FIG. 12 may be implemented by a case management system, such as case management system 206 of FIG. 2. In the example shown, case role definitions for a case model are received (1202). In some embodiments, case role definitions may be received via a case model developer user interface. The case model developer defines a hierarchical data model for a case model. For each case node in the case model, the developer associates one or more case roles with the case node (1204). For example, the developer may drag and drop a visual representation of a case role onto a displayed representation of a case node. At each case node, for each case role that has been associated with that case node, the permissions to be associated with that case role at that case node are defined and (at runtime) set (1206). For example, in various embodiments, one or more of the following permissions may be set, with respect to metadata and/or content associated with a case node: create (C), read (R), update/modify (U), and delete (D).

In various embodiments, permissions set for a case role with respect to a case node may be defined dynamically, e.g., by reference to the respective phases/states of a state machine associated with the case node. For example, a case role may have a first set of permissions at a case node when the case node's state machine is in a first phase/state, and a second (different) set of permissions at the case node when the case node's state machine is in a second phase/state. In some embodiments, in each state one or more permissions associated with causing transitions to be made to one or more other states may be set based on case role. In some embodiments, permission may be set by case role to indicate which case roles will be able to assign users to case roles and/or to change such assignments.

Figure 13:
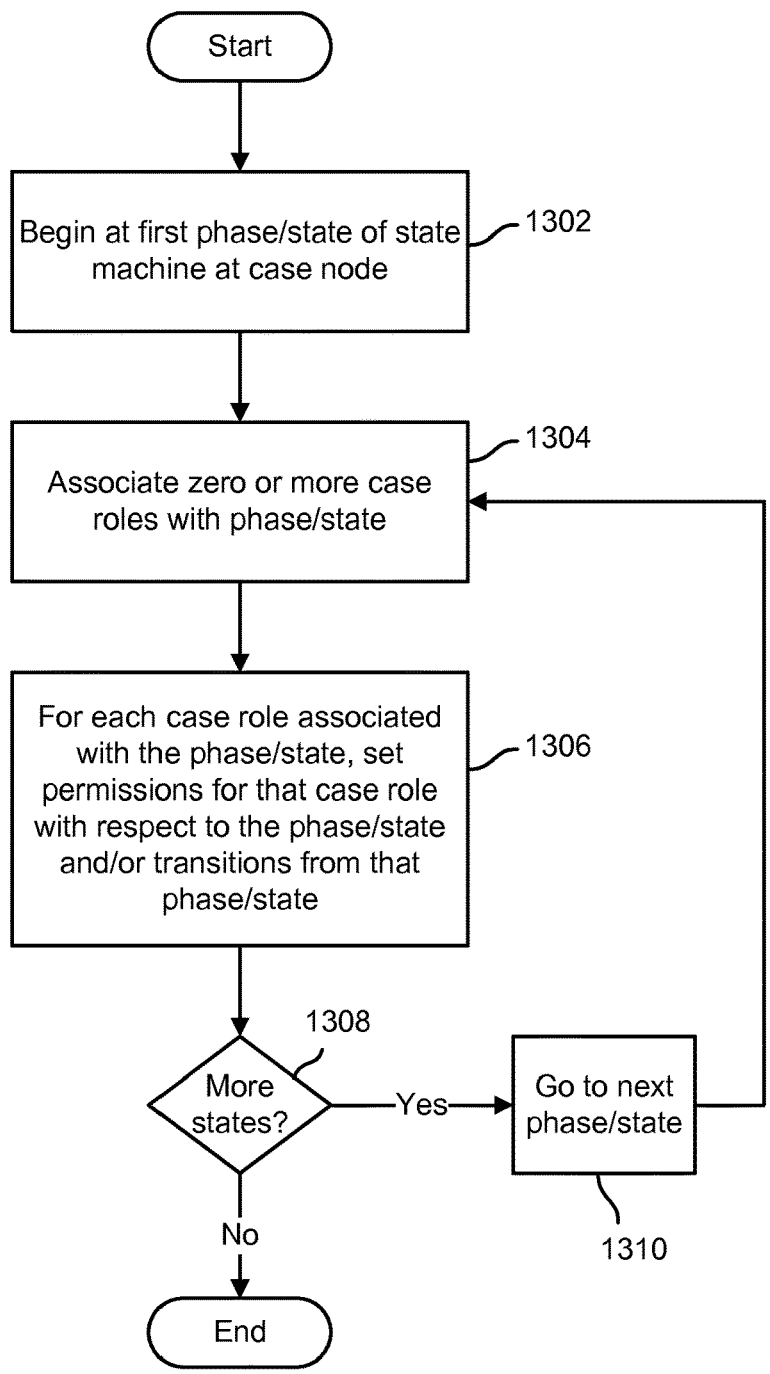
FIG. 13 is a flow chart illustrating an example embodiment of a process to define hierarchical permissions conditioned on case node state.

FIG. 13 is a flow chart illustrating an example embodiment of a process to define hierarchical permissions conditioned on case node state. In some embodiments, the process of FIG. 13 may be implemented by a case management system, such as case management system 206 of FIG. 2. In the example shown, definition of permissions by case node phase/state begins at a first phase/state of a state machine associated with a case node (1302). Case role(s) is/are associated with the phase state (1304), and for each case role associated with the case node phases/state permissions are set for the case role with respect to the case node when the state machine of the case node is in that phase/state (1306). Processing continues with respect to the respective phases/states of the state machine of the case node, until permissions have been defined for each phase/state (1308, 1310).

In various embodiments, hierarchical and/or conditional (e.g., by case node phase/state) permissions defined as described in connection with FIGS. 12 and 13 may be embodied in a case model definition. At runtime, when a case instance is instantiated based on the case model definition, data comprising the case model definition is parsed to determine and create runtime data structures reflecting the hierarchical data model of the case model, and with respect to each node permissions are set by case role (and, as applicable, conditioned on case node phase/state). Permission-related services associated with a runtime environment in which the case instance is realized are used in some embodiments to enforce hierarchical and/or conditional (e.g., by phase/state) permissions as defined in the case model definition. For example, in some embodiments, the ability of a given user to access and/or perform requested operations with respect to metadata and/or content, to initiate transitions between states, and/or to assign or modify the assignment of users to case roles with respect to the case instance is determined by the runtime environment based on which (if any) case role(s) the user has been assigned with respect to the case instance, and the permission(s), if any, associated with such case role(s) with respect to an applicable case node in a current phase/state of a state machine associated with the case node.

Figure 14:
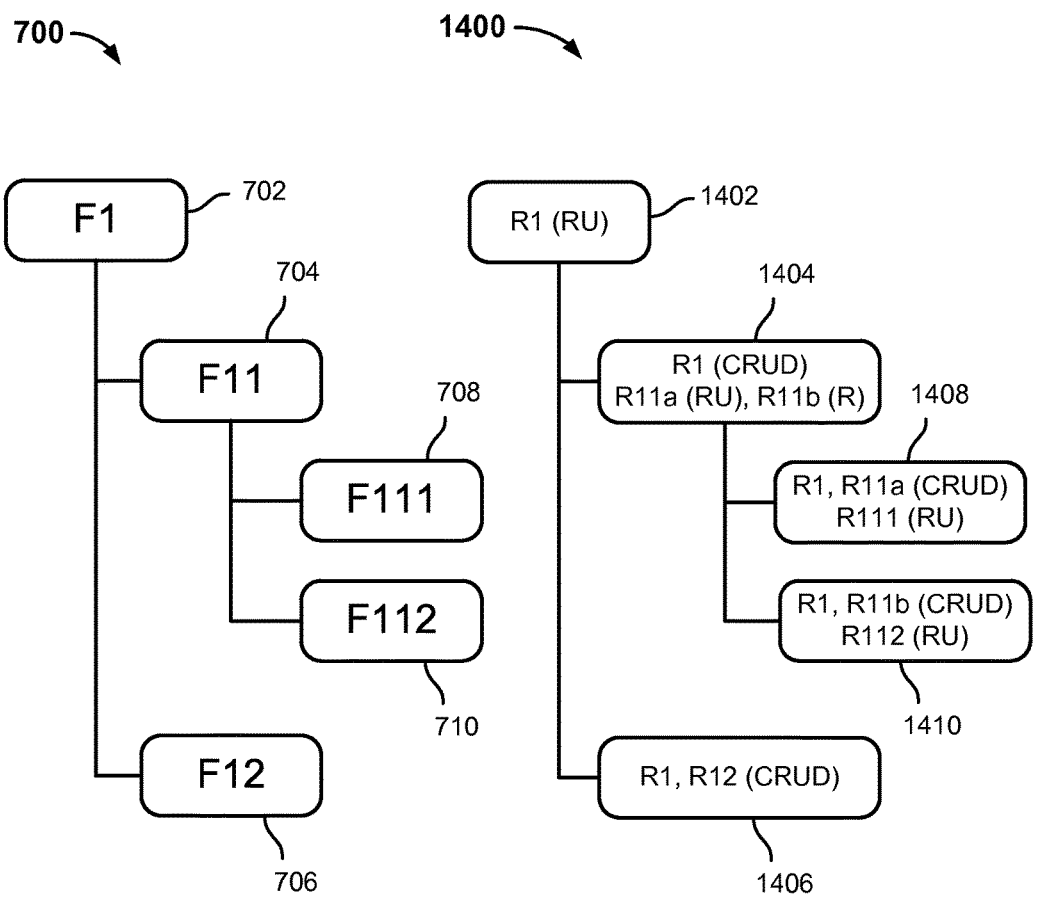
FIG. 14 is a block diagram illustrating an example of a hierarchical data model and associated permission in an embodiment of a case management system.

FIG. 14 is a block diagram illustrating an example of a hierarchical data model and associated permission in an embodiment of a case management system. In various embodiments, hierarchical permissions such as those shown in FIG. 14 may be defined via a process such as the one shown in FIG. 12. In the example shown, a hierarchical permission model 1400 has been defined, corresponding to the hierarchical data model 700 of FIG. 7. The hierarchical permission model 1400, includes in this example, for each case node of the hierarchical data model 700 of FIG. 7 a corresponding hierarchical permission model node. For example, nodes 1402, 1404, 1406, 1408, and 1410 of the permissions model 1400 correspond to nodes 700, 704, 706, 708, and 710, respectively, of data model 700.

At each node of the hierarchical permission model 1400, one or more case roles are identified as having permissions at the corresponding case node, and for each the permissions to be provided are indicated. For example, at node 1402, a case role "R1" is listed as having read (R) and update (U) permissions with respect to root case node 702. In various embodiments, the case role R1 would, by virtue of having read and update permissions set at the root case node 702, have at least the same permissions at child case nodes of node 702, which in this example would include all nodes given that case node 702 is a root node. As illustrated by node 1404 of the hierarchical permissions model 1400, the case role R1 at some nodes may be given permissions beyond those assigned at the root node 1402. In this example, the case role R1 is assigned permissions to create, read, update, or delete content and/or metadata at case node 704 corresponding to hierarchical permission model node 1404.

In addition, in the example shown in FIG. 14, additional case roles such as R11a, R11b, R111, R112, and R12 are associated at permission model nodes 1404, 1406, 1408, and 1410 with corresponding case nodes of data model 700, and at each permission model node the respective permissions set for each respective case role that has been associated are indicated.

In various embodiments, a case role may have permission(s) defined at a parent case node, and may have the same permission(s) with respect to child case nodes of the parent node by virtue of the permission(s) set for the case role at the parent node or, instead, permissions defined at the parent node may be overridden with a different set of permissions defined at the child node(s) for the same case role. In some embodiments, a case role may be a "contained" case role, and may have permission(s) only with respect to the case node at which it was assigned the permission(s). For example, a set of permissions defined for a case role at a specific case node may be "contained" in the sense that the permissions defined at that node do not extend beyond that node, even if the case role exists and has a user assigned to it with respect to other case nodes.

Figure 15A:
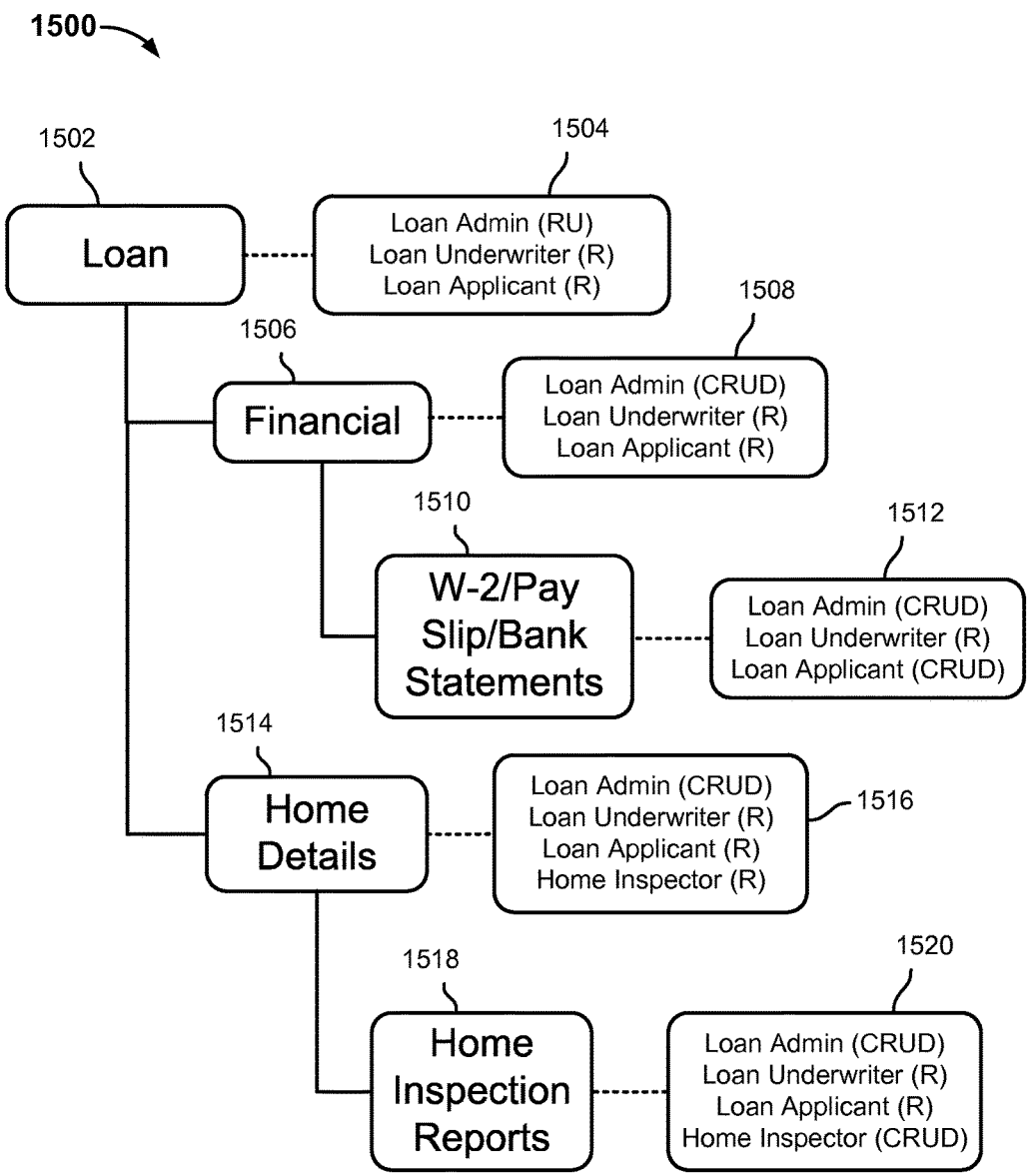
FIG. 15A is a block diagram illustrating an example of a hierarchical data model and associated permission model in an embodiment of a case management system.

FIG. 15A is a block diagram illustrating an example of a hierarchical data model and associated permission model in an embodiment of a case management system. In various embodiments, hierarchical permissions such as those shown in FIG. 15A may be defined via a process such as the one shown in FIG. 12. In the example shown, a case model 1500 includes a hierarchical data model comprising case nodes 1502, 1506, 1510, 1514, and 1518, and a corresponding hierarchical permissions model comprising nodes 1504, 1508, 1512, 1516, and 1520. Each case node in case model 1500 in this example has a corresponding set of case roles and associated permissions. For example, case roles and permissions 1504 are associated with root node 1502, and identify the case roles "Loan Admin", "Loan Underwriter", and "Loan Applicant" as having the respective permissions indicated. In this example, permissions are defined at each descendant/child case node of root node 1502 with references to these three case roles. At certain case nodes, one or more of them have permissions beyond those indicated at the root node 1502. For example, permissions model node 1508 indicates that users having the role "Loan Admin" at root node Loan (1502) are granted rights to create and delete content (C, D) in addition to the read and update (R,U) permissions set at the root node 1502, 1504. Similar, users having the role "Loan Applicant" at root node Loan (1502) are granted in permission model node 1512 permissions to create, read, update or delete metadata and/or content with respect to the financial documents listed at case node 1510, for example to enable such users to upload copies of personal financial documents, replace outdated documents with more recent ones, etc.

In the example shown in FIG. 15A, the case role "Home Inspector" does not have any permission associated with root node 1502 or the sub-tree beginning at node 1506, but instead only has permissions with respect to the sub-tree comprising case nodes 1514 and 1518. At "Home Details" case node 1514, the "Home Inspector" case role is granted read permission (1516), and with respect to "Home Inspection Reports" case node 1518 the "Home Inspector" case role is granted permission to create, read, update, and delete (1520).

Figure 15B:
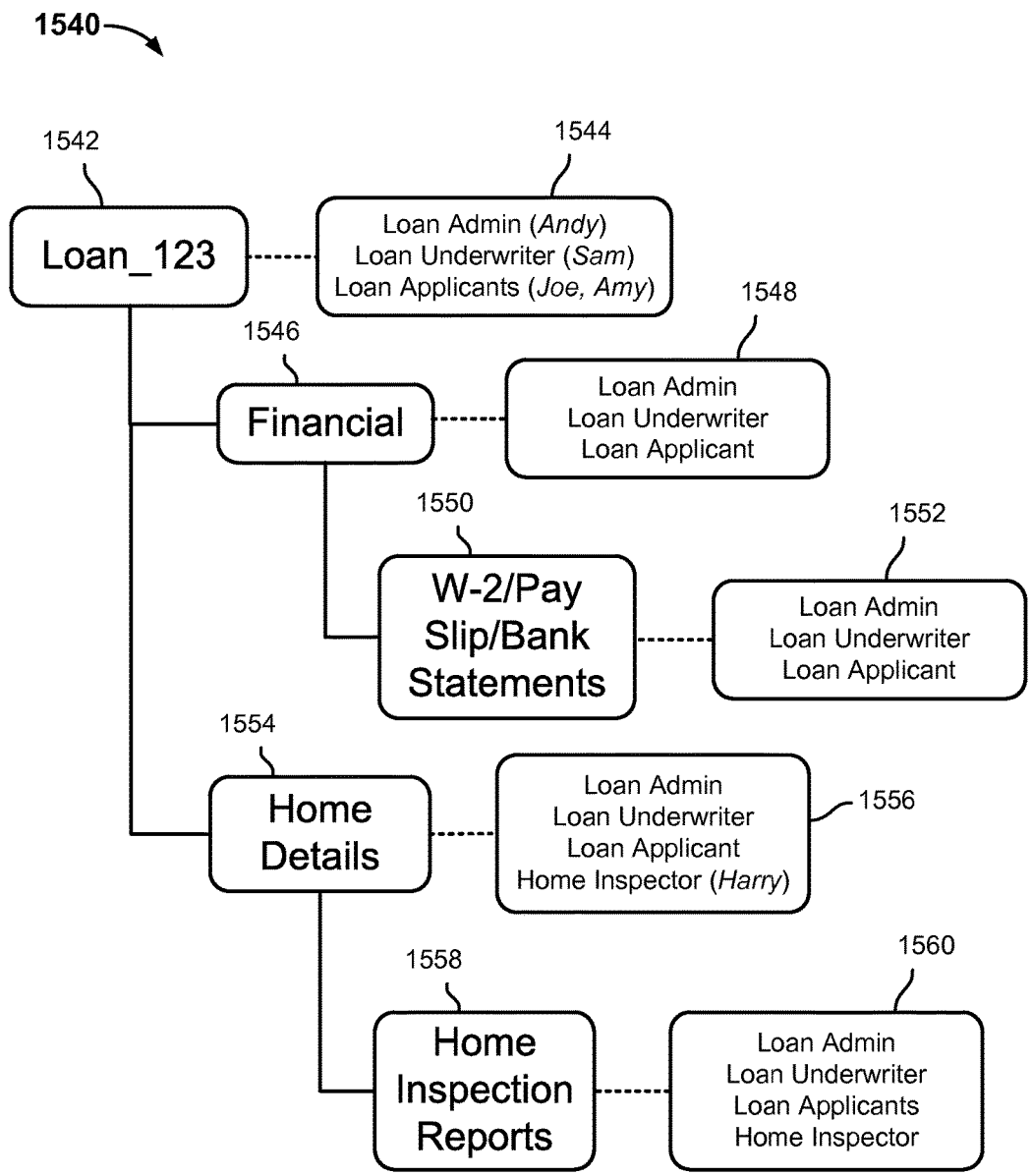
FIG. 15B is a block diagram illustrating an example of an instance of a hierarchical data model and associated permission model in an embodiment of a case management system.

FIG. 15B is a block diagram illustrating an example of an instance of a hierarchical data model and associated permission model in an embodiment of a case management system. In various embodiments, hierarchical permissions such as those shown in FIG. 15B may be defined via a process such as the one shown in FIG. 12. In the example shown, a case instance 1540 based on case model 1500 of FIG. 15A (in this example an instance "Loan 123" of the case type/model "Loan") includes a plurality of case nodes 1542, 1546, 1550, 1554, and 1558 and for each a corresponding set of permissions 1544, 1548, 1552, 1556, and 1560, respectively, and as applicable specific users associated with each case role. For example, case instance 1540 includes root node 1542 with associated permissions 1544, identifying specific users who have been associated with the case roles indicated for purposes of the case instance 1540. In the example shown, the users "Joe" and "Amy" have been associated with the "Loan Applicant" case role, and in various those users would be afforded with respect to case instance 1540 the privileges indicated in case model 1500 of FIG. 15A as being associated with that case role, e.g., permission to create, read, update, and delete metadata/content comprising and/or otherwise associated with case node 1550 (see 1510, 1512 of FIG. 15A). Similarly, the user "Harry" is assigned the case role "Home Inspector" with respect to nodes 1554 and 1558 of case instance 1540 (see case role/permission information at 1556, 1560), which would result in the user "Harry" being afforded with respect to case instance 1540 those permissions associated with the case role "Home Inspector" in case model 1500 of FIG. 15A (see 1514, 1516, 1518, and 1520 of FIG. 15A).

While in the example shown in FIGS. 15A and 15B each case role has a statically define set of permissions at each case node, in various embodiments such permissions may be defined in the case model as being conditioned on case node specific and/or other contextual data, such as a phase/state of a state machine associated with the case node. In addition, in various embodiments, permissions other than with respect to metadata and/or content may be defined, such as permissions regarding the ability to add or modify case role assignments with respect to a case instance, and/or permissions to cause phase/state transitions within a state machine of a case node. For example, a case role may be defined to have permission to update content and/or to make or change case role assignments when a case node is in a first state, but not when the same case node is in a second state. Similarly, within a case node and a particular phase/state thereof, a case role may be defined as having a permission to cause a state transition to a next phase/state of the case node, but only if one or more conditions defined in the case model have been satisfied with respect to the case node, such as all required content has been uploaded, all required metadata has been provided, and/or an action required to be taken by another user has been completed.

Figure 16:
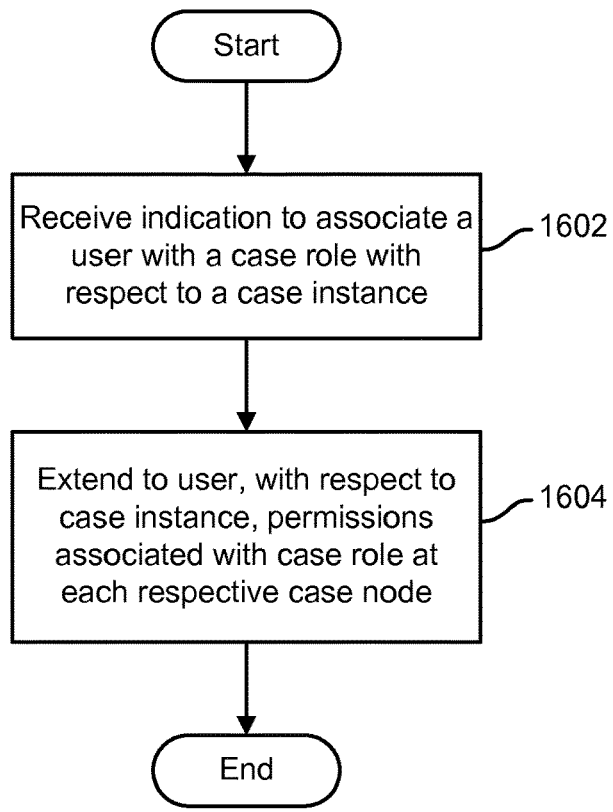
FIG. 16 is a flow chart illustrating an example embodiment of a process to associate users with case roles.

FIG. 16 is a flow chart illustrating an embodiment of a process to associate users with case roles. In various embodiments, a case management system, such as case management system 206 of FIGS. 2 and 3, may implement the process of FIG. 16. In the example shown, an indication to associate a user with a case role with respect to a case instance is received (1602). For example, an administrative user may assign a case management system user to a case role with respect to one or more case instances, e.g., via an administrative user interface. Permissions associated with the case role, e.g., in a permissions model comprising a case model definition, are extended to the user with respect to applicable case nodes of the case instance (1604).

Figure 17:
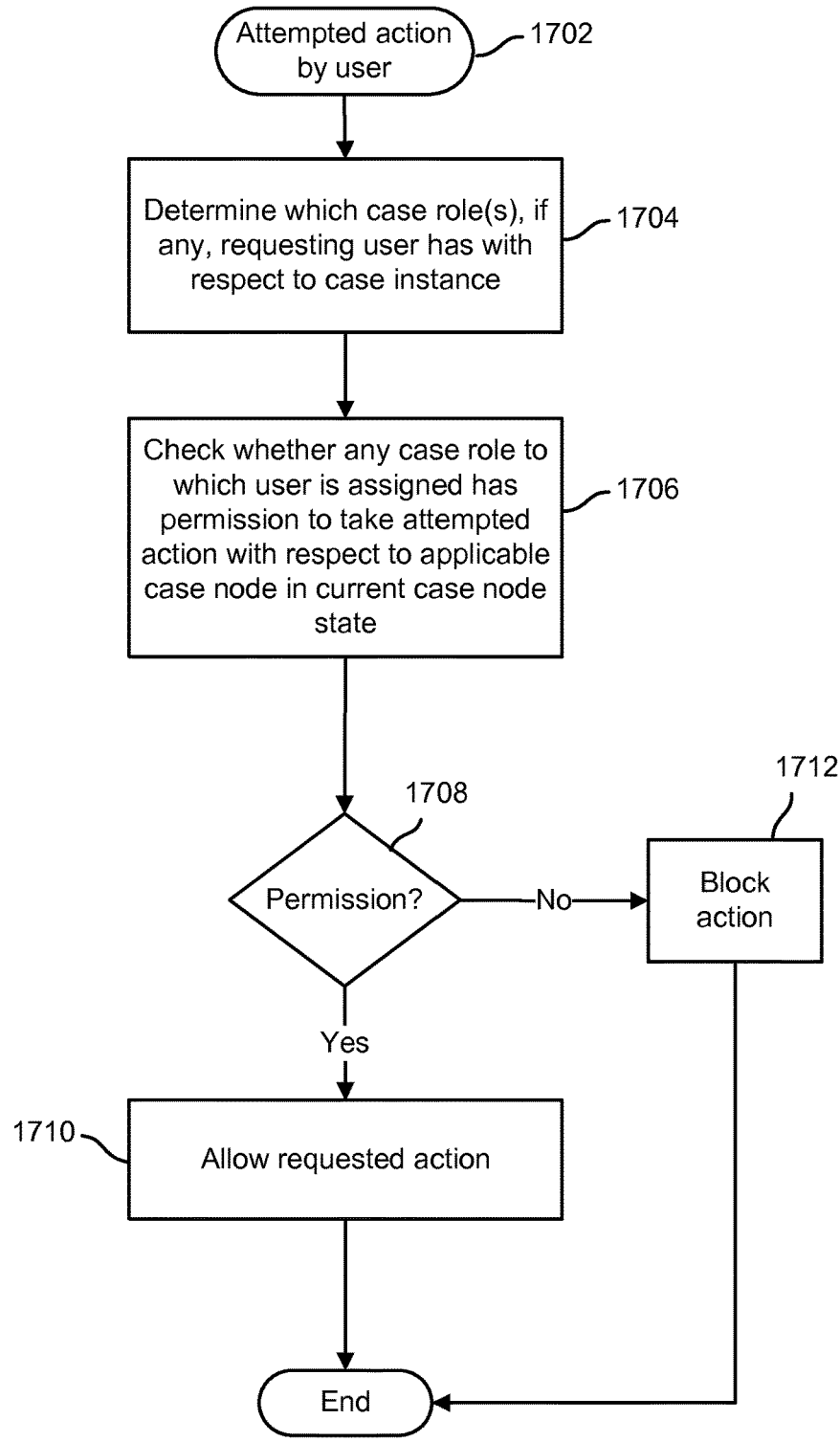
FIG. 17 is a flow chart illustrating an example embodiment of a process to provide and control access based on a hierarchical permissions model.

FIG. 17 is a flow chart illustrating an embodiment of a process to provide and control access based on a hierarchical permissions model. In some embodiments, the process of FIG. 17 is used to implement step 1604 of FIG. 16. In the example shown, when a user attempts to perform an action with respect to a case instance (1702), e.g., create, read, update, or delete metadata and/or content, assign a user to a case role, cause a transition to a new phase/state with respect to a case node of the case instance, etc., it is determined which case role(s), if any, the requesting user has with respect to the case instance (1704). It is determined whether any case role to which the user has been assigned with respect to the case instance has the permission required to perform the action with respect to the case instance (1706). If so (1708), the requested action is allowed to be performed by the user (1710). If not (1708), the requested operation is not allowed to be performed by the user (1712).

For example, in the example shown in FIGS. 15A and 15B, the user "Harry" is assigned the role "Home Inspector". As a result, a request by the user "Harry" to update a home inspection report document and/or metadata associated with the Home Inspection Reports node 1558 of case instance 1540 of FIG. 15B would be allowed (see nodes 1156, 1158 and 1560 of FIG. 15B, and corresponding nodes 1518 and 1520 of FIG. 15A), whereas a request by the same user "Harry" to read financial metadata at case node 1546 of case instance 1540 of FIG. 15B would not be allowed (see nodes 1544, 1550, and 1552 of FIG. 15B, and corresponding nodes 1506 and 1508 of FIG. 15A, indicating the "Home Inspector" case role has no permission at the applicable case node).

Providing the ability to define/identify a case role by a "descendent case role alias" is disclosed. In various embodiments, a descendent case role alias may be a role that a user is deemed to be associated with by virtue of having been assigned more directly another role for a case instance. For example, a user defining a case model may include for a root or other higher level node a case role "case viewer", which role is deemed to be held by users who fill referenced roles defined and/or assigned at lower nodes in the hierarchy.

Figure 18A:
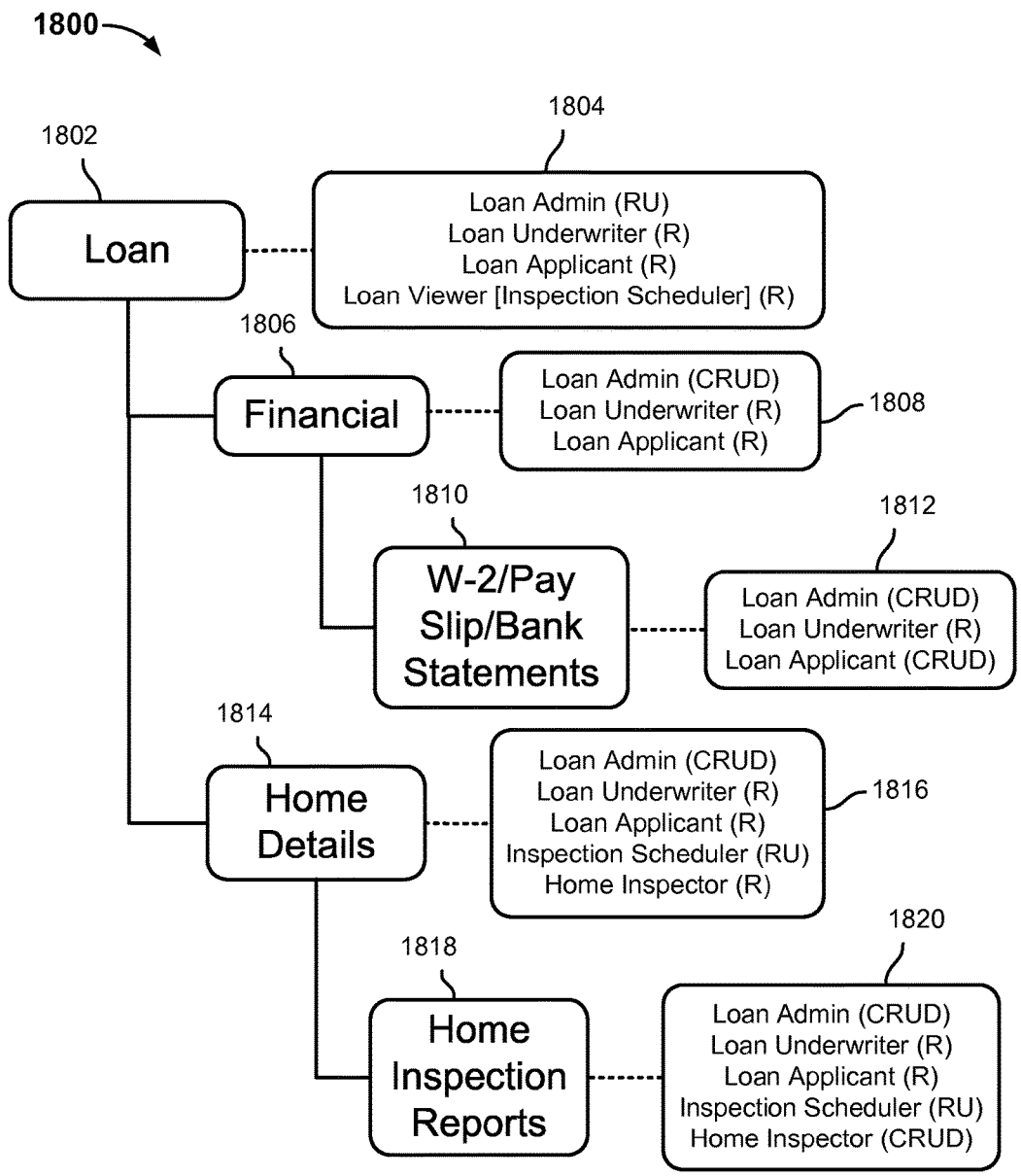
FIG. 18A is a block diagram illustrating an example of a hierarchical data model and associated permission model in an embodiment of a case management system.

FIG. 18A is a block diagram illustrating an example of a hierarchical data model and associated permission model in an embodiment of a case management system. In some embodiments, a case management system such as case management system 206 of FIG. 2 may be used to create and/or implement a case model such as the one shown in FIG. 18A. In the example shown, case model 1800 includes a hierarchical data model comprising nodes 1802, 1806, 1810, 1814, and 1818, and a corresponding permissions model comprising nodes 1804, 1808, 1812, 1816, and 1820. Referring to case node 1814 and associated permissions model node 1816, the case roles "Inspection Scheduler" and "Home Inspector" are listed, along with associated permissions for each. The latter two roles similar have permission set, in permissions model node 1820, with respect to case node 1818.

In some embodiments, a user assigned only to one or both of the "Inspector Scheduler" and/or "Home Inspector" case roles would not have access to metadata at case nodes above node 1814 in the model shown. In some embodiments, a user browsing a case management system for a particular case instance, for example to schedule a home inspection or to upload a home inspection report, in this example, may not be able to find the case instance due to their lack of access permission with respect to the root node (assuming, for example, that a search of case instances by property address or other identifier required access to metadata at the root node, for example).

In various embodiments, and in the example shown in FIG. 18A, a "descendent case role alias" may be defined to enable users assigned directly to roles that are contained at an associated case node within a case model hierarchy to be given access to specified information at higher levels of the hierarchy, without requiring that such user also be associated directly with roles at such higher levels of the hierarchy. For example, in the case model 1800 of FIG. 18A, a case role "Loan Viewer" is defined at the root node 1802, 1804. In various embodiments, the "Loan Viewer" case role may be defined as a descendent case role alias. Users become associated with the case role "Loan Viewer", and are afforded permissions associated with that role, by virtue of being assigned directly to another case role that is referenced by the descendent case role alias. In the example shown, the case role "Loan Viewer" is defined at permission model node 1804 to be an alias of the case role "Inspection Scheduler" role identified in permissions model nodes 1816 and 1820 of FIG. 18A.

Figure 18B:
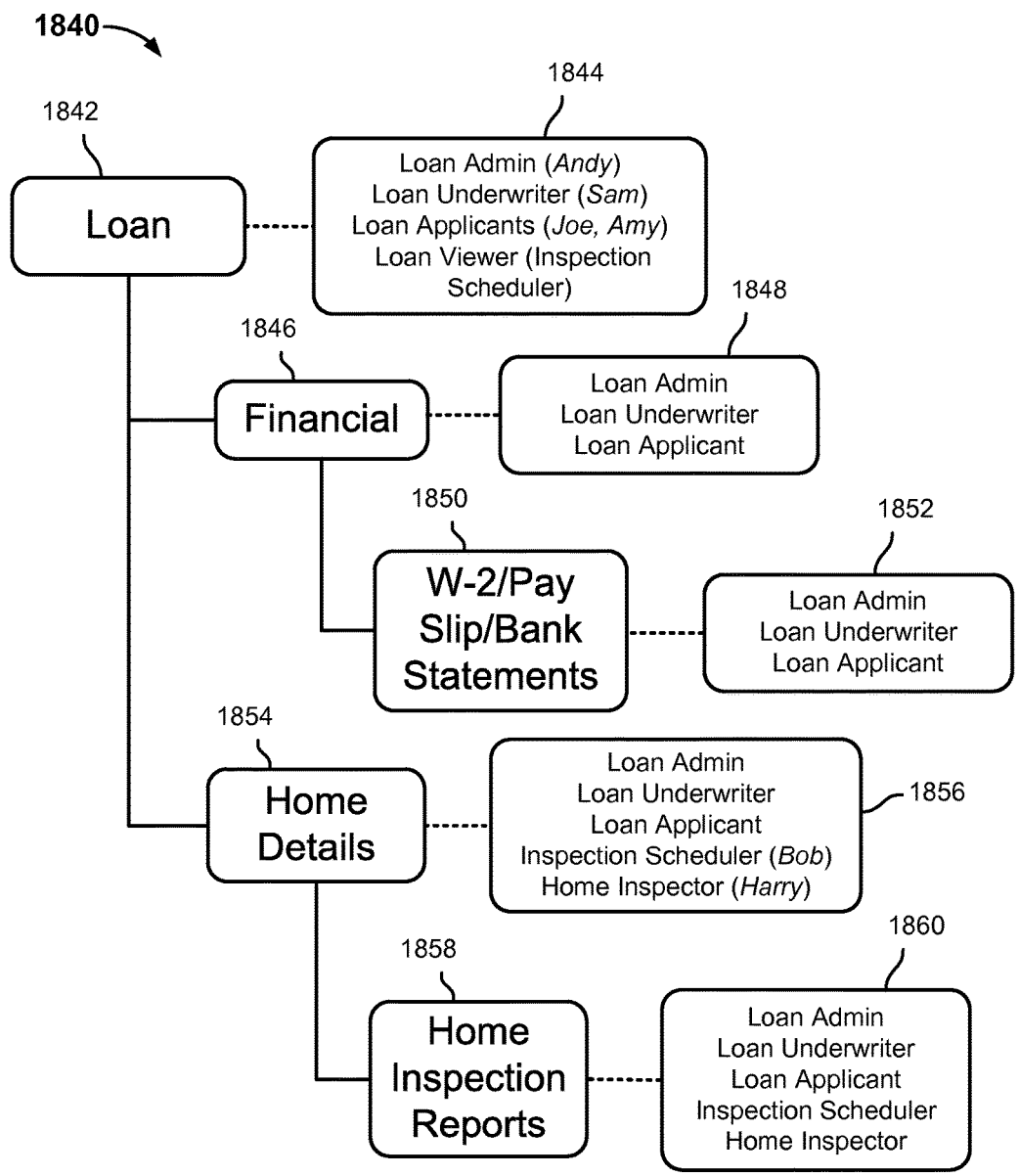
FIG. 18B is a block diagram illustrating an example of an instance of a hierarchical data model and associated permission model in an embodiment of a case management system.

FIG. 18B is a block diagram illustrating an example of an instance of a hierarchical data model and associated permission model in an embodiment of a case management system. In some embodiments, a case management system such as case management system 206 of FIG. 2 may be used to create and/or implement a case instance such as the one shown in FIG. 18B, e.g., using a case model such as the one shown in FIG. 18A. In the example shown, case instance 1840, based on case model 1800 of FIG. 18A, includes a plurality of case nodes 1842, 1846, 1850, 1854, and 1858, with associated permissions as indicated at nodes 1844,

1848, 1852, 1856, and 1860. In this example, descendant case role alias "Loan Viewer" is defined to reference the case role "Inspection Scheduler", as indicated at node 1844 of instance 1840. In some embodiments, the reference is defined in the underlying case model, such as at permission node 1804 of case model 1800 of FIG. 18A.

In the example shown in FIG. 18B, a user "Bob" has been assigned to the case role "Inspection Scheduler" with respect to case instance 1840, as indicated at node 1856. In various embodiments, as a result of the user "Bob" having been assigned to the case role "Inspection Scheduler", referenced by descendant case role alias "Loan Viewer", the user "Bob" would be afforded the permissions associated with the case role "Inspector Scheduler" with respect to case nodes 1854 and 1858, respectively (see 1856, 1860, and corresponding nodes 1816 and 1820 of FIG. 18A), and also would be afforded the permissions associated with the "Loan Viewer" case role in model 1800 of FIG. 18A. Specifically, in the examples shown in FIGS. 18A and 18B, the user "Bob" would be afforded "read" permission with respect to the root node 1842 of instance 1840 (see 1804 of FIG. 18A), and all descendant (e.g., child) case nodes of the root node, even though the user "Bob" is only directly assigned to a case role that is contained within the "Home Details" sub-tree of case instance 1840 based on case model 1800.

By contrast, the user "Harry" is assigned only to the case role "Home Inspector" in case instance 1840 (see 1856). Since the descendant case role alias "Loan Viewer" in this example does not reference the case role "Home Inspector", the user "Harry" would not be afforded the permissions associated with the descendant case role alias "Loan Viewer", and instead would be limited to the permissions associated with the case role "Home Inspector" (see 1816, 1820 of FIG. 18A).

In some embodiments, permissions defined at a node for a descendant case role alias do not necessary extend to child nodes of the node at which the alias is defined. For example, in the example shown in FIGS. 18A and 18B, since "Loan Viewer" has no permissions defined at nodes 1846 and 1850, a Loan Viewer will not be able to see content associated with nodes 1846 and 1850. For example, in this case the case developer may not want the "Inspection Scheduler" to be able to read financial records of the loan applicant. However, if the "Loan Viewer" role were defined to have read permissions on nodes 1846 and 1850, explicitly, then a user having the Loan Viewer role by virtue of being assigned a case role for which Loan Viewer is an alias, such as "Bob" in the example shown in FIG. 18B, would be able to view content on nodes 1846 and 1850.

In various embodiments, use of a descendant case role alias as disclosed herein enables users assigned to subordinate case roles to be given limited access to information at case nodes other than those with respect to which they have specific involvement, including in various embodiment visibility that may be required to find a case instance by browsing case instances, without any specific/further action being required to add or remove such users from case roles at the root or other node at which the descendant case role alias is defined. In the example shown in FIGS. 18A and 18B, for example, if the user "Mary" were to replace the user "Bob" in the role of "Inspection Scheduler" with respect to instance 1840 of FIG. 18B, no further action would be required in order to extend to Mary the privileges associated with the "Loan Viewer" descendant case role alias.

Figure 19:
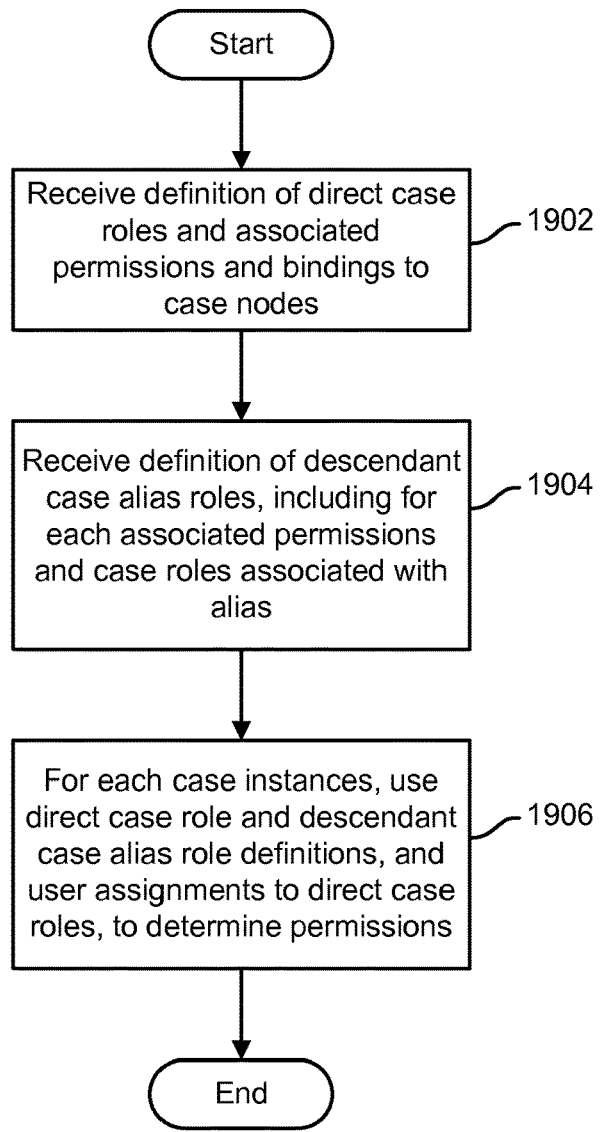
FIG. 19 is a flow chart illustrating an example embodiment of a process to define hierarchical permissions model for case management.

FIG. 19 is a flow chart illustrating an embodiment of a process to define hierarchical permissions model for case management. In various embodiments, the process of FIG. 19 may be implemented by a case management system, such as case management system 206 of FIGS. 2 and 3. In the example shown, a definition and/or identification of case roles to be associated directly (i.e., not as a descendant case role alias) with case nodes comprising a case model, and for each case role with respect to each case node an indication of permissions to be associated with the case role at that case node are received (1902). A definition and/or identification of one or more case roles to be associated with one or more case nodes as a descendant case role alias, including associated permissions and an indication of referenced case roles to which permissions associated with the descendant case role alias are to be extended, is/are received (1904). For example, in the example shown in FIGS. 18A and 18B, a definition of the descendant case role alias "Loan Viewer", its association with the root case node 1802, the "read" permission associated therewith at node 1804, and the reference to the "Inspection Scheduler" case role (see 1804 of FIG. 18A) may be received. For case instances based on the model defined in steps 1902 and 1904, the direct case role and descendant case role alias definitions are used to extend to users assigned to a case role referenced by a descendant case role alias one or more permissions associated with the descendant case role alias, in addition to permissions associated with the case role to which the user is assigned directly (1906).

Figure 20:
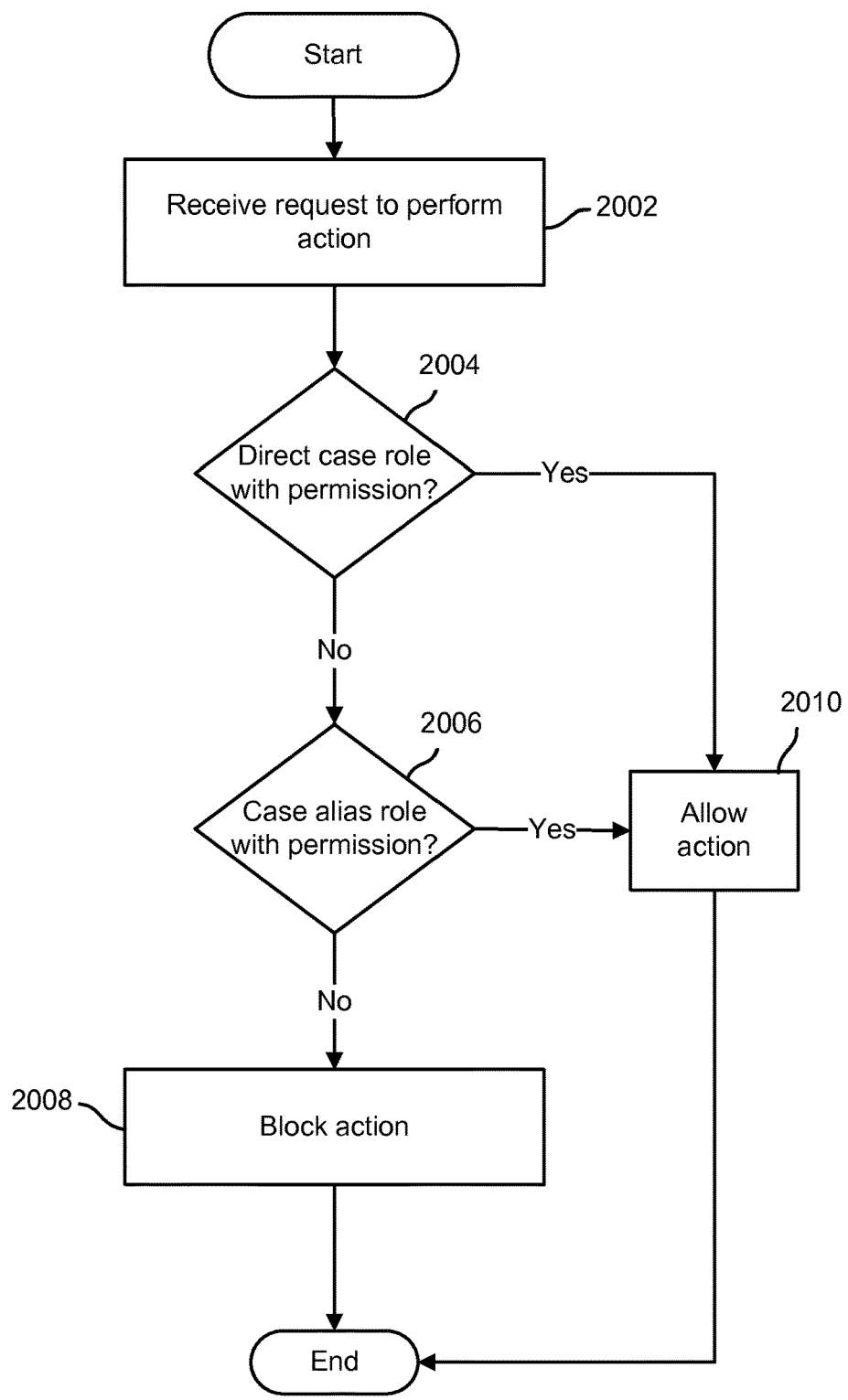
FIG. 20 is a flow chart illustrating an example embodiment of a process to provide and control access based on a hierarchical permissions model.

FIG. 20 is a flow chart illustrating an embodiment of a process to provide and control access based on a hierarchical permissions model. In various embodiments, the process of FIG. 20 may be implemented by a case management system, such as case management system 206 of FIGS. 2 and 3. In some embodiments, the process of FIG. 20 may be used to implement step 1906 of FIG. 19. In the example shown, a request to perform an action is received (2002). If the requesting user has a permission to perform the action by virtue of having been assigned directly to a case role that has the permission (2004), as defined in the case model, or if the required permission is associated with a descendant case role alias that references a case role to which the user is assigned (2006), the action is allowed (2010). Otherwise, the requested action is blocked (2008).

In various embodiments, use of descendant case role aliases as disclosed herein enable sophisticated permissions to be modeled without putting additional burdens on case model developers. If a different user is assigned to replace a user previously assigned to a case role that is referenced by a descendant case role alias, no further action is required to extend to the newly-assigned user permissions associated with the descendant case role alias. Similarly, a developer in various embodiments can change permissions associated with a descendant case role alias and have such changes be realized with respect to users associated with case roles referenced by the descendant case role alias, without requiring further changes for each such referenced case role.

Although the foregoing embodiments have been described in some detail for purposes of clarity of understanding, the technology is not limited to the details provided. There are many alternative ways of implementing the technology. The disclosed embodiments are illustrative and not restrictive.

What is claimed is:

1. A method of controlling access in a case management system, the method comprising:
  receiving, by a device processor, a definition that associates a descendant case role alias with a first case node at a first hierarchical level of a hierarchical data model, the definition further associating a permission with the descendant case role alias and referencing a referenced case role associated with a second case node at a second hierarchical level of the hierarchical data model, wherein the second hierarchical level is a descendant of the first hierarchical level within the hierarchical data model; and automatically controlling access to a case instance of a case model comprising the hierarchical data model, content associated with the case instance, and actions associated with the case instance in the case management system, at least in part by using the definition to extend the permission to a user assigned to the referenced case role with respect to the case instance.

2. The method of claim 1, wherein the permission is extended to the user with respect to the first case node.

3. The method of claim 1, wherein the permission is extended to the user with respect to the first case node but not with respect to one or more other case nodes that are below the first case node in a hierarchy of the hierarchical data model.

4. The method of claim 1, wherein the first case node comprises a root case node and the permission is extended to the user with respect to the root case node and all other case nodes included in the case instance.

5. The method of claim 1, wherein the referenced case role is contained within the second case node.

6. The method of claim 3, wherein permissions associated directly with the referenced case role extend only to the second case node and one or more case nodes included in a sub-tree of which the second case node comprises a sub-tree root.

7. The method of claim 1, further comprising receiving an indication that a new user has been assigned to the referenced case role, and automatically extending to the new user said permission associated with the descendant case role alias.

8. The method of claim 1, wherein the definition comprises a hierarchical permission model.

9. The method of claim 1, wherein the definition comprises the case model.

10. The method of claim 1, wherein using the definition to extend the permission to a user assigned to the referenced case role with respect to the case instance comprises:

receiving a request to perform an action with respect to the first case node, wherein the action requires said permission; and allowing the action based at least in part on a determination that a requesting user with which the request is associated is assigned the referenced case role.

11. A case management system, comprising:

a storage device configured to store a hierarchical data model; and a processor coupled to the storage device and configured to control access in the case management system by:

receiving a definition that associates a descendant case role alias with a first case node at a first hierarchical level of the hierarchical data model, the definition further associating a permission with the descendant case role alias and referencing a referenced case role associated with a second case node at a second hierarchical level of the hierarchical data model, wherein the second hierarchical level is a descendant of the first hierarchical level within the hierarchical data model; and automatically controlling access to a case instance of a case model comprising the hierarchical data model, content associated with the case instance, and actions associated with the case instance in the case management system, at least in part by using the definition to extend the permission to a user assigned to the referenced case role with respect to the case instance.

12. The system of claim 11, wherein the permission is extended to the user with respect to the first case node.

13. The system of claim 11, wherein the permission is extended to the user with respect to the first case node but not with respect to one or more other case nodes that are below the first case node in a hierarchy of the hierarchical data model.

14. The system of claim 11, wherein the referenced case role is contained within the second case node.

15. The system of claim 11, wherein permissions associated directly with the referenced case role extend only to the second case node and one or more case nodes included in a sub-tree of which the second case node comprises a sub-tree root.

16. The system of claim 11, wherein the processor is further configured to control access in the case management system by receiving an indication that a new user has been assigned to the referenced case role, and automatically extending to the new user said permission associated with the descendant case role alias.

17. The system of claim 11, wherein using the definition to extend the permission to a user assigned to the referenced case role with respect to the case instance comprises:

receiving a request to perform an action with respect to the first case node, wherein the action requires said permission; and allowing the action based at least in part on a determination that a requesting user with which the request is associated is assigned the referenced case role.

18. A computer program product to control access in a case management system, the computer program product being embodied in a non-transitory computer readable storage medium and comprising computer instructions for:

receiving a definition that associates a descendant case role alias with a first case node at a first hierarchical level of a hierarchical data model, the definition further associating a permission with the descendant case role alias and referencing a referenced case role associated with a second case node at a second hierarchical level of the hierarchical data model, wherein the second hierarchical level is a descendant of the first hierarchical level within the hierarchical data model; and automatically controlling access to a case instance of a case model comprising the hierarchical data model, content associated with the case instance, and actions associated with the case instance in the case management system, at least in part by using the definition to extend the permission to a user assigned to the referenced case role with respect to the case instance.

19. The computer program product of claim 18, wherein using the definition to extend the permission to a user assigned to the referenced case role with respect to the case instance comprising the hierarchical data model comprises:

receiving a request to perform an action with respect to the first case node, wherein the action requires said permission; and allowing the action based at least in part on a determination that a requesting user with which the request is associated is assigned the referenced case role.

20. The computer program product of claim 18, further comprising computer instructions for receiving an indication that a new user has been assigned to the referenced case role, and automatically extending to the new user said permission associated with the descendant case role alias.

\* \* \* \* \*